(12) United States Patent
Sorrentino

(10) Patent No.: US 9,450,722 B2
(45) Date of Patent: Sep. 20, 2016

(54) REFERENCE SIGNAL MAPPING

(71) Applicant: Telefonaktiebolaget L M Ericsson (publ), Stockholm (SE)

(72) Inventor: Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/419,036

(22) PCT Filed: Aug. 9, 2013

(86) PCT No.: PCT/SE2013/050958
§ 371 (c)(1),
(2) Date: Feb. 2, 2015

(87) PCT Pub. No.: WO2014/051494
PCT Pub. Date: Apr. 3, 2014

(65) Prior Publication Data
US 2015/0244507 A1    Aug. 27, 2015

Related U.S. Application Data

(60) Provisional application No. 61/681,481, filed on Aug. 9, 2012.

(51) Int. Cl.
    *H04L 5/00*        (2006.01)
(52) U.S. Cl.
    CPC ........... *H04L 5/0048* (2013.01); *H04L 5/0007* (2013.01)
(58) Field of Classification Search
    CPC ..................... H04L 5/0007; H04L 5/0048
    See application file for complete search history.

(56) References Cited

U.S. PATENT DOCUMENTS

| | | |
|---|---|---|
| 2006/0209670 A1 | 9/2006 | Gorokhov et al. |
| 2007/0036066 A1 | 2/2007 | Thomas et al. |
| 2008/0107192 A1 | 5/2008 | Mukkavilli et al. |
| 2010/0034076 A1* | 2/2010 | Kishiyama ............ H04J 11/005 370/210 |
| 2012/0051209 A1* | 3/2012 | Sun ......................... H04J 13/18 370/208 |
| 2012/0147837 A1 | 6/2012 | Shimomura et al. |

(Continued)

FOREIGN PATENT DOCUMENTS

WO    2008016325 A2    2/2008

OTHER PUBLICATIONS

Ericsson, et al., "Remaining details about UL RS configuration", 3GPP TSG RAN WG1 Meeting #70, Qingdao, China, Aug. 13, 2012, pp. 1-3, R1-123813, 3GPP.

(Continued)

*Primary Examiner* — Brian D Nguyen
(74) *Attorney, Agent, or Firm* — Coats & Bennett, P.L.L.C.

(57) ABSTRACT

An example method of mapping a set of reference signal samples to subcarriers is disclosed. First and second subsets of samples having contiguous index values are determined. The second subset of samples are mapped to a first subset of subcarriers, such that a first sample of the second subset of samples having a lowest index value of the second subset of samples is mapped to a first subcarrier at a first end of a bandwidth. The first subset of samples are mapped to a second subset of subcarriers of the bandwidth, such that a last sample of the first subset of samples having a highest index value of the first subset of samples is mapped to a last subcarrier at an opposite second end of the bandwidth. A complementary method of demapping subcarriers is also disclosed.

28 Claims, 18 Drawing Sheets

(56) References Cited

U.S. PATENT DOCUMENTS

| | | | |
|---|---|---|---|
| 2012/0182974 A1* | 7/2012 | Dai | H04L 5/0048 370/336 |
| 2012/0188878 A1* | 7/2012 | Simon | H04W 4/06 370/241 |
| 2012/0218881 A1* | 8/2012 | Liang | H04L 1/1861 370/216 |
| 2012/0250656 A1* | 10/2012 | Noh | H04L 5/0023 370/330 |
| 2012/0320843 A1* | 12/2012 | Kim | H04L 5/001 370/329 |
| 2012/0322483 A1* | 12/2012 | Ji | H04L 5/00 455/509 |

OTHER PUBLICATIONS

Jones, D., "Decimation-in-time (DIT) Radix2 FFT", 2006, retrieved on Jan. 22, 2015, pp. 1-9, retrieved from internet: http://cnx.org/contents/ce67266a185147e48bfc82eb447212b4@7/Decimationintime_(DIT)_Radix.

Samsung, "UCI Resource Requirements in UL CoMP", 3GPP TSG RAN WG1 #68bis, Jeju, Korea, Mar. 26, 2012, pp. 1-3, R1-121639, 3GPP.

Qualcomm Incorporated, "Uplink control signaling for CoMP", 3GPP TSG-RAN WG1 #67, San Francisco, CA, USA, Nov. 14, 2011, pp. 1-3, R1-114118, 3GPP.

\* cited by examiner

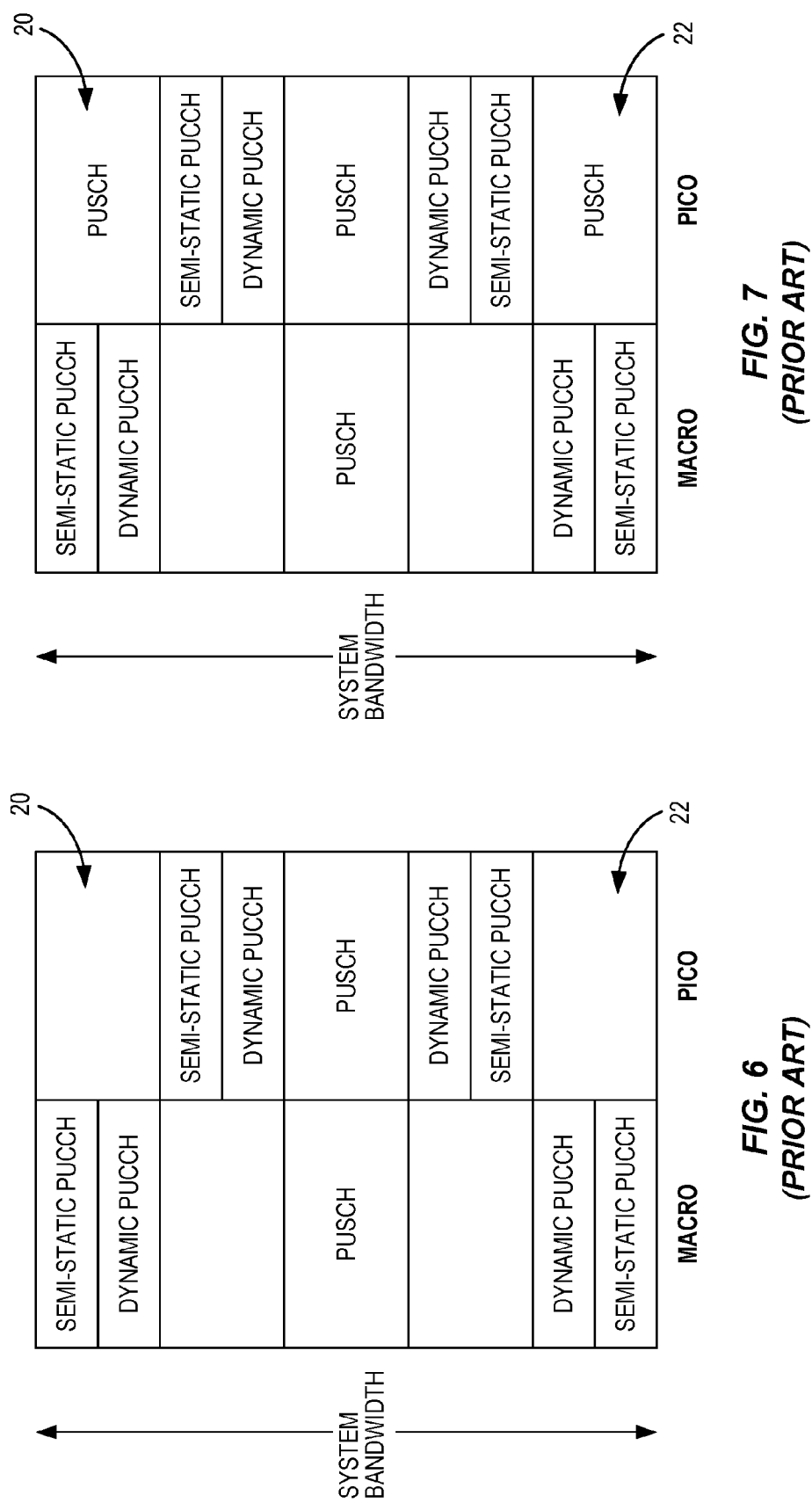

REFERENCE SIGNAL MAPPING

RELATED APPLICATIONS

This application claims the benefit of U.S. Provisional Application No. 61/681,481, filed Aug. 9, 2012, the disclosure of which is incorporated herein by reference in its entirety.

TECHNICAL FIELD

This application relates to methods and apparatus for subcarrier mapping and demapping of, e.g., precoded samples and/or reference signal samples.

BACKGROUND

Long Term Evolution (LTE) networks are designed to support user equipment (UEs) from different 3rd Generation Partnership Project (3GPP) releases (e.g., LTE Rel-8/9/10/11) in a backward compatible way. One of the LTE network design objectives is to enable co-scheduling of such UEs in time, frequency and space dimensions with as few scheduling constraints as possible. This may include, for example, multi-user Multiple-Input-Multiple-Output (MU-MIMO).

Furthermore, the LTE standard should be able to support various and flexible deployments. Some examples of expected deployments for modern LTE networks (Rel-11 and beyond) include, e.g.:
  Macro-deployments, where large cells are typically divided into independent sectors;
  HetNet-deployments, where pico-cells are deployed within the coverage of a macro-cell in order, e.g., to improve coverage for high data rate UEs; and
  Hotspot scenarios where an access point serves a small area with high throughput need.

A "cell" is characterized in LTE by a "cell-ID" and a carrier frequency, which affects several cell-specific algorithms and procedures.

In addition, LTE networks are designed with the aim of enabling optional CoMP (Coordinated multipoint processing) techniques, where different sectors and/or cells operate in a coordinated way in terms of, e.g., scheduling and/or processing. An example is uplink (UL) CoMP where a signal originating from a single UE is typically received at multiple reception points and is jointly processed in order to improve link quality. UL joint processing (also referred to as UL CoMP) allows transformation of what is regarded as inter-cell interference in a traditional deployment into a useful signal. Therefore, LTE networks taking advantage of UL CoMP may be deployed with a smaller cell size compared to traditional deployments in order to fully take advantage of the CoMP gains.

LTE uses Orthogonal Frequency-Division Multiplexing (OFDM) in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval. In the time domain, LTE downlink transmissions are organized into radio frames of 10 ms, with each radio frame consisting of ten equally-sized subframes of length $T_{subframe}=1$ ms (see FIG. 2). Furthermore, the resource allocation in LTE is typically described in terms of resource blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the base station transmits control information about which terminals data is being transmitted to and upon which resource blocks the data is being transmitted in the current downlink subframe. This control signaling is typically transmitted in the first 1, 2, 3, or 4 OFDM symbols in each subframe. A downlink system with 3 OFDM symbols as control signaling is illustrated in FIGS. 1-3.

LTE uses Hybrid Automatic Repeat Requests (HARQ), where, after receiving downlink data in a subframe, a UE attempts to decode it and reports to the base station whether the decoding was successful (ACK) or not (NAK). In case of an unsuccessful decoding attempt, the base station can retransmit the erroneous data. Uplink control signaling from the terminal to the base station for HARQ consists of:
  HARQ acknowledgements for received downlink data;
  terminal reports related to the downlink channel conditions, used as assistance for the downlink scheduling; and
  scheduling requests indicating that a mobile terminal needs uplink resources for uplink data transmissions.

In order to achieve a convenient trade-off between scheduling flexibility and compact signal dynamic range (or, equivalently, low cubic metric (CM)), DFT-spread OFDM (DFTS-OFDM) is employed in LTE UL. DFTS-OFDM, also known as "single-carrier OFDM," is a modulation technique where the OFDM IDFT modulator is preceded (at the transmitter) by a DFT precoder operating over the scheduled bandwidth. The assigned bandwidth needs to be contiguous, i.e., no sparse allocation of RBs is supported in the UL. At the receiver, the DFT OFDM demodulator is followed by an IDFT decoder.

In LTE, multi-cluster OFDM is also optionally supported in the UL, where two non-contiguous clusters of RBs are associated in the same subframe, thus violating the single carrier property of DFTS-OFDM. A single DFT precoder is employed, and the precoded symbols are mapped to two clusters of non-contiguous subcarriers.

If a mobile terminal has not been assigned an uplink resource for data transmission, the L1/L2 control information (e.g., channel-status reports, hybrid-ARQ acknowledgments, and scheduling requests) is transmitted in uplink resources (resource blocks) specifically assigned for uplink L1/L2 control on the Physical Uplink Control Channel (PUCCH). As illustrated in FIGS. 1-4, these resources are located at the edges of the total available cell bandwidth. Each such resource consists of twelve "subcarriers" (one resource block) within each of the two slots of an uplink subframe. In order to provide frequency diversity, these frequency resources utilize frequency hopping on the slot boundary, e.g., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g., in case of very large overall transmission bandwidth supporting a large number of users, additional resource blocks can be assigned next to the previously assigned resource blocks.

The reasons for locating the PUCCH resources at the edges of the overall available spectrum are two-fold:
  together with the frequency hopping described above, this maximizes the frequency diversity experienced by the control signaling; and assigning uplink resources for the PUCCH at other positions within the spectrum (i.e., not at the edges), would have fragmented the uplink spectrum, making it impossible to assign very wide transmission bandwidths to a single mobile terminal and still retain the single-carrier property of the uplink transmission.

The bandwidth of one resource block during one subframe is too large for the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence. A linear phase rotation in the frequency domain is equivalent to applying a cyclic shift (CS) in the time domain. Thus, although the term "phase rotation" is used herein, the term cyclic shift is sometimes used with an implicit reference to the time domain. FIG. 4 illustrates an example phase shift of an uplink L1/L2 control signaling transmission on the PUCCH.

The resource used by the PUCCH is therefore not only specified in the time-frequency domain by the resource block pair, but also by the phase rotation applied. Similarly to the case of reference signals, there are up to twelve different phase rotations specified, providing up to twelve different orthogonal sequences from each cell-specific sequence. However, in the case of frequency-selective channels, not all the twelve phase rotations can be used if orthogonality is to be retained. Typically, up to six rotations are considered usable in a cell.

As mentioned above, uplink L1/L2 control signaling include hybrid-ARQ acknowledgements, channel-status reports and scheduling requests. Different combinations of these types of messages are possible as described further below, but to explain the structure for these cases it is beneficial to discuss separate transmission of each of the types first, starting with the hybrid-ARQ and the scheduling request. There are two formats defined for the PUCCH, each capable of carrying a different number of bits.

Resource Block Mapping for PUCCH

The signals described above, for both of the PUCCH formats, are, as already explained, transmitted on a resource block pair with one resource block in each slot. The resource block pair to use is determined from the PUCCH resource index. Thus, the resource block number to use in the first and second slot of a subframe can be expressed as:

RBnumber($i$)=$f$(PUCCH index,$i$)           eq. (1)

where i is the slot number (0 or 1) within the subframe and f is a function found in 3GPP specifications.

Multiple resource block pairs can be used to increase the control-signaling capacity. When one resource block pair is full the next PUCCH resource index is mapped to the next resource block pair in sequence. The mapping is in principle done such that PUCCH format 2 (channel-status reports) is transmitted closest to the edges of the uplink cell bandwidth with the semi-static part of PUCCH format 1 next and finally the dynamic part of PUCCH format 1 in the innermost part of the bandwidth.

Three semi-static parameters are used to determine the resources to use for the different PUCCH formats:

$N_{RB}^{(2)}$, provided as part of the system information, controls on which resource block pair the mapping of PUCCH format 1 starts;

$N_{PUCCH}^{(1)}$ controls the split between the semi-static and dynamic part of PUCCH format 1; and X controls the mix of format 1 and format 2 in one resource block. In most cases, the configuration is done such that the two PUCCH formats are mapped to separate sets of resource blocks, but there is also a possibility to have the border between format 1 and 2 within a resource block.

The PUCCH resource allocation in terms of resource blocks is illustrated in FIGS. 1-5. The numbers 0, 1, 2, . . . represent the order in which the resource blocks are allocated to PUCCH (i.e., a large PUCCH configuration may need resource 0-6 while a small configuration may use only 0).

The introduction of new deployments as described above and the extensive use of UL CoMP implies a certain degree of fragmentation in the use of UL resources, especially at band edges where PUCCH resources are not dynamically optimized at each subframe. As a consequence, some UL RBs may be available at both band edges at certain subframes.

One possibility would be to exploit such RBs by scheduling PUSCH transmissions over them. However, due to the limited size of such resource blocks, the transmission would be quite inefficient. Another possibility would be to exploit both unused band edges for the same UE by multi-cluster OFDM. However, such a technique is associated with increased CM and it is therefore supported by a minority of terminals, if any.

SUMMARY

The present disclosure proposes a modified mapping of subcarriers to avoid increasing CM when scheduling the PUSCH at band edges in a multi-cluster fashion. In one or more embodiments this includes mapping reference signal samples. In one or more embodiments this includes mapping precoded samples (e.g., between a DFT precoder and an OFDM modulator). Demapping may be similarly performed. Additionally, efficient signaling techniques for dynamically switching between single-carrier transmission and multi-cluster DFTS-OFDM (with or without modified subcarrier mapping) are proposed.

According to one example embodiment, a method of mapping a set of reference signal samples to subcarriers within a bandwidth allocated for transmission over a channel is disclosed. Each sample has an associated index value from a set of consecutive index values, and the set of reference signal samples are consecutively ordered by their index value. According to the method, a first subset of samples from the set of reference signal samples that have contiguous index values are determined, with a first sample of the first subset of samples having a lowest index value in the set of consecutive index values. A second subset of samples from the set of reference signal samples that have contiguous index values are also determined, with a last sample of the second subset of samples having a highest index value in the set of consecutive index values. Each index value of the second subset of samples is higher than each index value of the first subset of samples, and each sample in the set is included in one of the first or second subsets of samples. The second subset of samples are mapped to a first subset of subcarriers of the bandwidth, such that a first sample of the second subset of samples having a lowest index value of the second subset of samples is mapped to a first subcarrier at a first end of the bandwidth. The first subset of samples are mapped to a second subset of subcarriers of the bandwidth, such that a last sample of the first subset of samples having a highest index value of the first subset of samples is mapped to a last subcarrier at an opposite second end of the bandwidth.

A corresponding wireless terminal operative to map a set of reference signal samples to subcarriers within a bandwidth allocated for transmission over a channel is also disclosed. Each sample has an associated index value from a set of consecutive index values, and the set of reference signal samples are consecutively ordered by their index value. The wireless terminal includes a subcarrier mapper including one or more processing circuits configured to determine a first subset of samples from the set of reference signal samples that have contiguous index values, wherein a first sample of the first subset of samples has a lowest index value in the set of index values; and configured to determine a second subset of samples from the set of reference signal samples that have contiguous index values, wherein a last sample of the second subset of samples has a highest index value in the set of index values. Each index value of the second subset of samples is higher than each index value of the first subset of samples, and each precoded sample in the set is included in one of the first or second subsets of samples.

The one or more processing circuits are further configured to map the second subset of samples to a first subset of subcarriers of the bandwidth, such that a first sample of the second subset of samples having a lowest index value of the second subset of samples is mapped to a first subcarrier at a first end of the bandwidth; and are configured to map the first subset of samples to a second subset of subcarriers of the bandwidth, such that a last sample of the first subset of samples having a highest index value of the first subset of samples is mapped to a last subcarrier at an opposite second end of the bandwidth.

In one or more embodiments, the channel comprises a Physical Uplink Shared Channel (PUSCH) in a Long Term Evolution (LTE) network. In one or more embodiments the reference signal samples are one of Sounding Reference Signal (SRS) samples and Demodulation Reference Sequence (DMRS) samples. In one or more embodiments, the first subset of samples are contiguously mapped to the second subset of subcarriers, and the second subset of samples are contiguously mapped to the first subset of subcarriers.

An example method of demapping subcarriers received within a bandwidth allocated for transmission over a given channel to a set of reference signal samples is also disclosed. Each precoded sample has an associated index value from a set of consecutive index values, and the set of reference signal samples are consecutively ordered by their index value. According to the method, a first subset of the subcarriers is determined, with a first subcarrier of the first subset of subcarriers having a lowest frequency of the subcarriers. A second subset of the subcarriers is also determined, with a last subcarrier of the second subset of subcarriers having a highest frequency of the subcarriers, and with the frequency of each subcarrier in the second subset of subcarriers being higher than the frequency of each subcarrier in the first subset of subcarriers.

In the demapping method, the second subset of subcarriers are demapped to a first subset of samples having contiguous index values, such that a first subcarrier of the second subset of subcarriers having a lowest frequency of the second subset of subcarriers is demapped to have an index value at a first end of the range of index values. The first subset of subcarriers are demapped to a second subset of samples having contiguous index values, such that a last subcarrier of the first subset of subcarriers having a highest frequency of the first subset of subcarriers is demapped to have an index value at an opposite second end of the range of index values. Each sample in the set of reference signal samples is included in one of the first or second subsets of samples.

A complementary base station operative to demap subcarriers received within a bandwidth allocated for transmission over a given channel to a set of reference signal samples is also disclosed. Each sample has an associated index value from a range of consecutive index values, and the set of reference signal samples are consecutively ordered by their index value. The base station includes a subcarrier demapper comprising one or more processing circuits configured to determine a first subset of the subcarriers, wherein a first subcarrier of the first subset of subcarriers has a lowest frequency of the subcarriers. The one or more processing circuits are also configured to determine a second subset of the subcarriers, with a last subcarrier of the second subset of subcarriers having a highest frequency of the subcarriers, and the frequency of each subcarrier in the second subset of subcarriers being higher than the frequency of each subcarrier in the first subset of subcarriers.

The one or more processing circuits of the subcarrier demapper are configured to demap the second subset of subcarriers to a first subset of samples having contiguous index values, such that a first subcarrier of the second subset having a lowest frequency of the second subset of subcarriers is demapped to have an index value at a first end of the range of index values. The one or more processing circuits are also configured to demap the first subset of subcarriers to a second subset of precoded samples having contiguous index values, such that a last subcarrier of the first subset of subcarriers having a highest frequency of the first subset of subcarriers is demapped to have an index value at an opposite second end of the range of index values. Each sample in the set of reference signal samples is included in one of the first or second subsets of samples.

In one or more embodiments, the channel comprises a Physical Uplink Shared Channel (PUSCH) in a Long Term Evolution (LTE) network. In one or more embodiments the reference signal samples are one of Sounding Reference Signal (SRS) samples and Demodulation Reference Sequence (DMRS) samples. In one or more embodiments, the second subset of subcarriers are contiguously demapped to the first subset of samples, and the first subset of subcarriers are contiguously demapped to the second subset of samples.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 6 illustrates resource management of the PUCCH and PUSCH regions for macro and pico cells in a heterogeneous deployment, in which band edge resources for the pico cell are wasted.

FIG. 7 illustrates radio resource management of the PUCCH and PUSCH regions for macro and pico cells in a heterogeneous deployment, in which band edge resources for the pico cell that would otherwise be wasted are used for PUSCH transmission.

DETAILED DESCRIPTION

Figure 1:
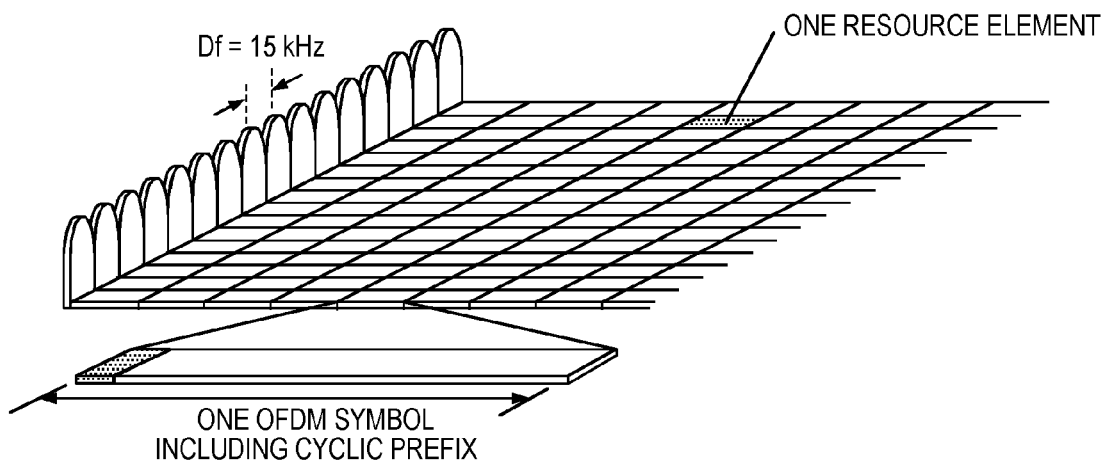
FIG. 1 illustrates a LTE downlink physical resource.
Figure 2:
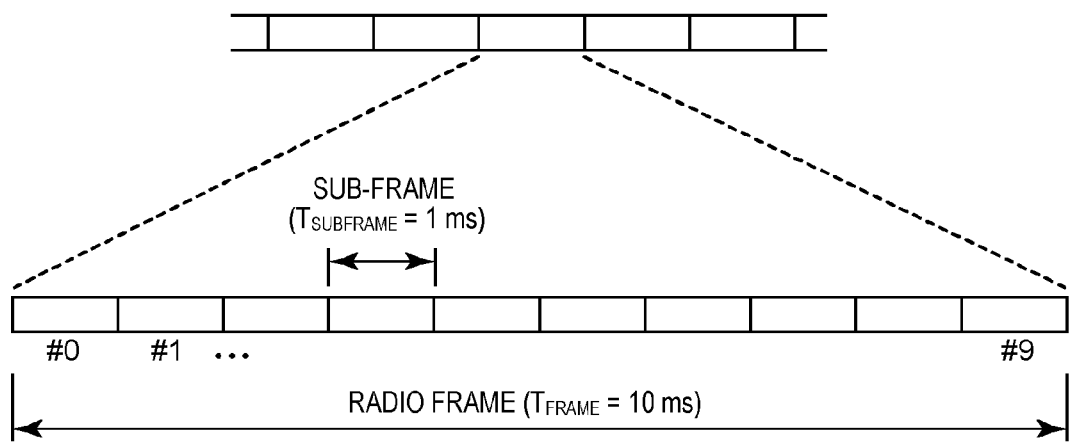
FIG. 2 illustrates a LTE time-domain structure.
Figure 3:
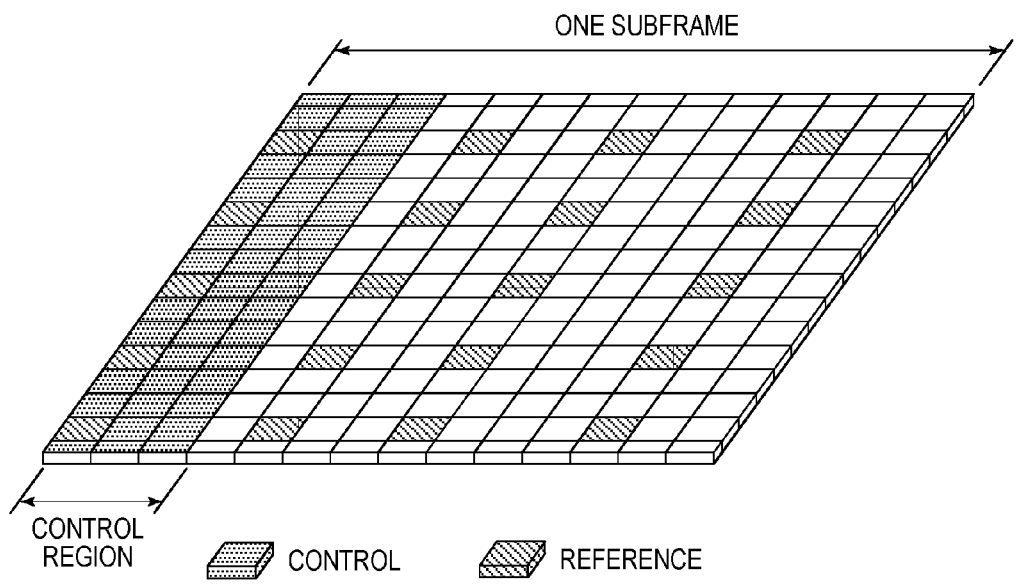
FIG. 3 illustrates a LTE downlink subframe.
Figure 4:
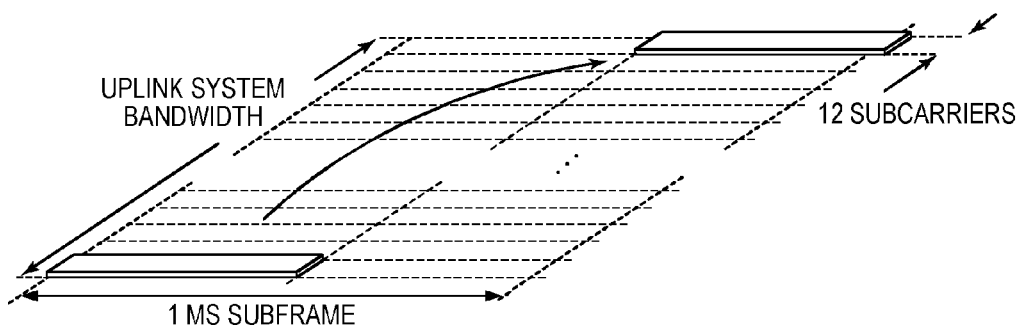
FIG. 4 illustrates uplink L1/L2 control signaling transmission on the PUCCH.
Figure 5:
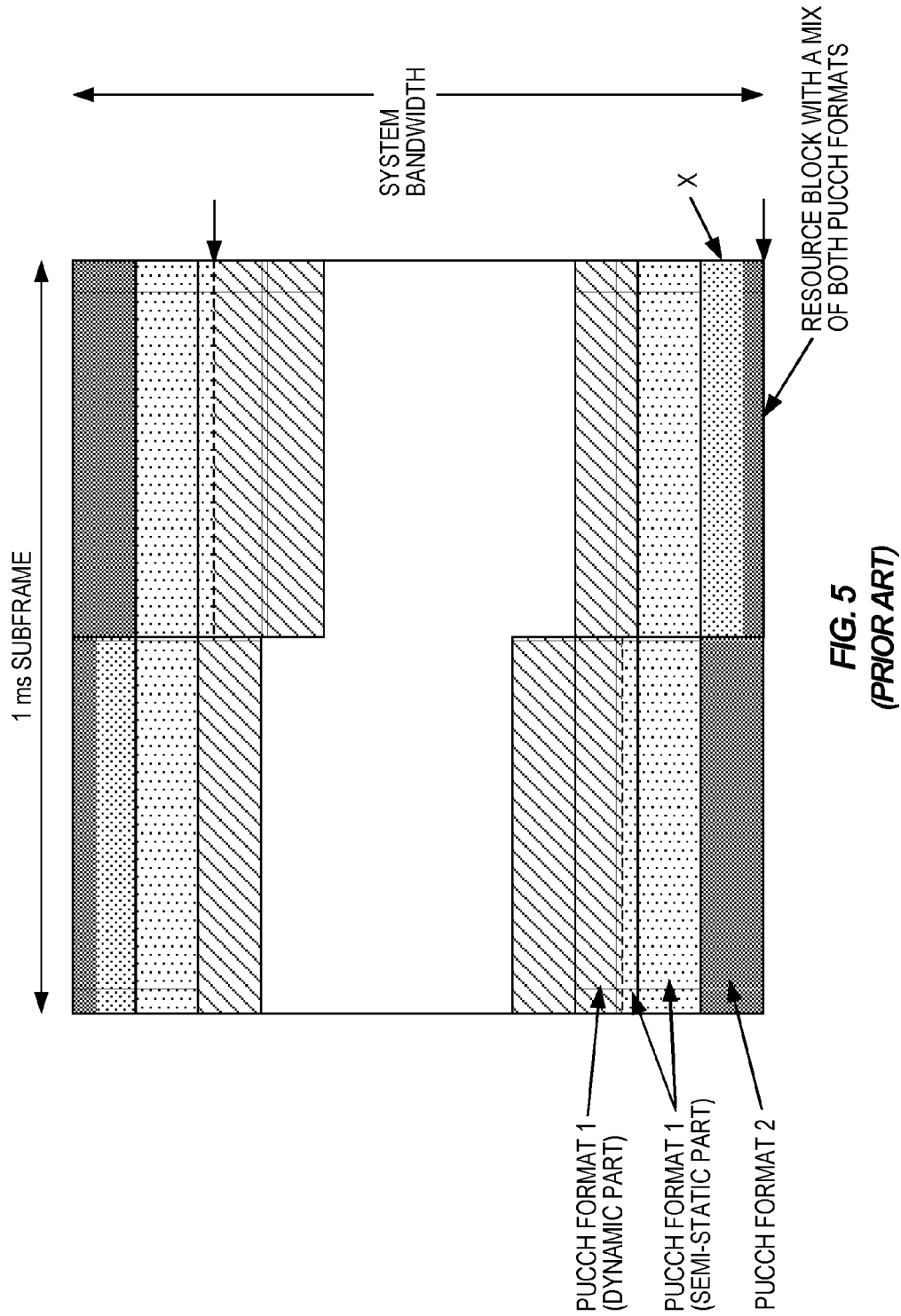
FIG. 5 illustrates an example allocation of resource blocks for the PUCCH.

For convenience, similar reference numerals are used throughout the Figures to indicate similar elements.

In LTE UL, resources at the edges of the system bandwidth might be used inefficiently in practical systems. Such behavior is expected to become even worse with future LTE releases (e.g., LTE Rel-11) and heterogeneous deployments. The reason is that band edge resources are symmetrically (at both band edges) assigned to periodic or aperiodic transmission of control signalling from the UE to the network (PUCCH). Several mechanisms for mapping control signalling radio resource assignments are supported by LTE, including both semi-static assignments, where PUCCH resources are scheduled with a predefined periodicity in time and on given resources, and dynamic assignments where allocation of radio resources is based on some scheduling parameters (e.g., for ACK/NACK feedback). Especially for CoMP heterogeneous deployments, efficiency in PUCCH resources assignment may be achieved by balancing reception point-specific resources and orthogonal resources between reception points. In case of point specific resources, the same radio resources may be reused at multiple points (i.e., at different geographical locations within the coordinated area). For orthogonal resources, the same radio resources are reserved for the same PUCCH transmission at multiple reception points. Possibly, joint processing at the reception points may be performed.

Additionally, it is expected that legacy UEs will be present in the network, reducing the efficiency in use of resources since legacy UEs do not support some tools for spatial reuse of PUCCH resources that were introduced in LTE Rel-11.

Typically, some RBs symmetrically placed at band edges may remain un-utilized at certain reception points and time instances. An example is shown in FIG. 6 where some band edge resources at a pico node are underutilized.

One possibility to increase spectral efficiency in cases similar to those shown in FIG. 6 is to schedule PUSCH data transmission at the band edges, on the underutilized resources, as in FIG. 7. However, typically such resources are rather narrow, say 1-2 RBs at each band edge. The benefit of scheduling such a narrow allocation might be rather limited, considering also that a frequency selective scheduler is not possible in this case.

Another possibility would be to schedule both band edges to the same UE (thus doubling the number of scheduled resources) by using multi-cluster allocation. However, there are two main disadvantages:

1) Multi-cluster allocation is supported but not mandated by the LTE standard, therefore it is expected that a minority of UEs, if any at all, will support it.
2) Multi-cluster allocation determines a time-domain signal with larger dynamic range (cubic metric) as compared to conventional single-carrier PUSCH transmission. This results in inefficient design and performance for the RF part of the UE, and this is the main reason why multi-cluster PUSCH is not mandated by LTE.

Figure 8:
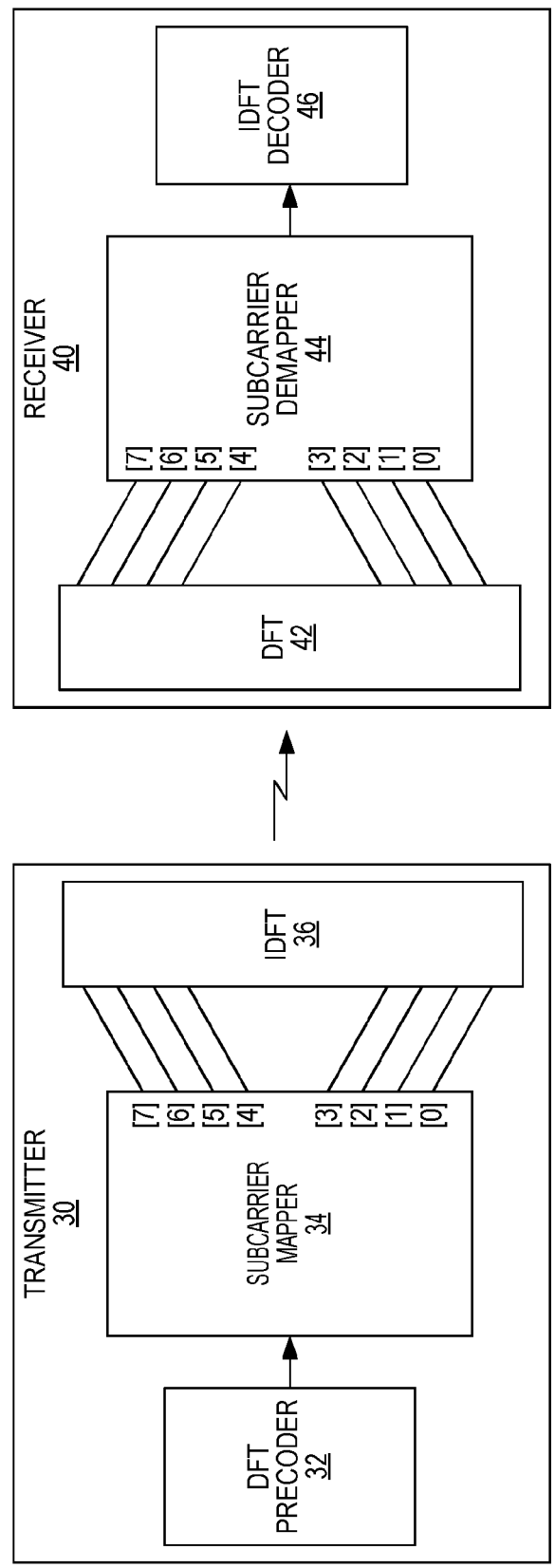
FIG. 8 illustrates a conventional transmitter and receiver mapping for multi-cluster DFTS-OFDM.
Figure 9:
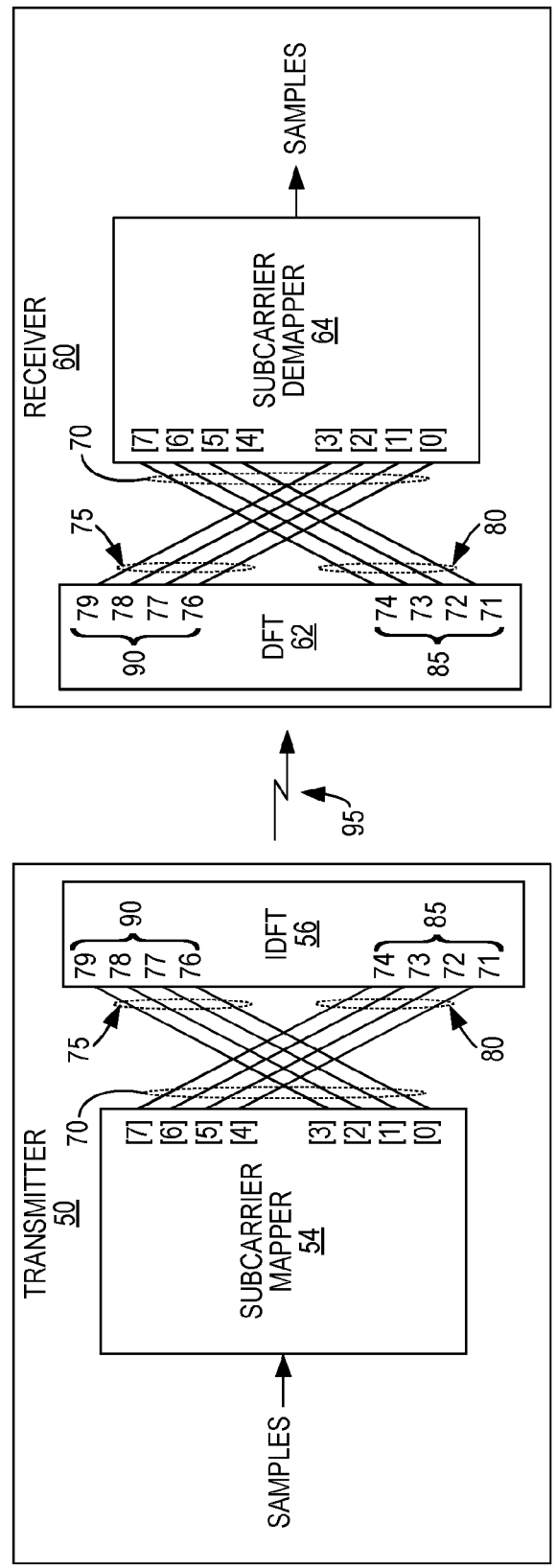
FIG. 9 illustrates a modified transmitter and receiver mapping for multi-cluster DFTS-OFDM (with only the DFTS-OFDM modulation/demodulation blocks being shown).

This disclosure proposes a method for achieving multi-cluster allocation at band edges without degrading CM as compared to single-cluster transmission of PUSCH. This is achieved by modifying the mapping of subcarriers of samples at the transmitter. The corresponding demapping is applied at the receiver. An example of the modulation chain for conventional multi-cluster PUSCH utilizing a conventional subcarrier mapping is shown in FIG. 8, while a modified mapping is shown in FIG. 9. In the example of FIG. 8, in transmitter 30 precoded samples from DFT precoder 32 are mapped, by subcarrier mapper 34, to IDFT 36 without any reordering. Likewise, in receiver 40 subcarriers from DFT 42 are demapped by subcarrier demapper 44 to IDFT decoder 46 without any reordering.

Referring to FIG. 9 though, by swapping the set of subcarriers assigned to the lower and upper edges of the band, the signal is mapped to the desired portions of the spectrum but CM is not degraded, compared to conventional single carrier PUSCH transmission. If the samples being input into subcarrier mapper 54 are precoded samples (e.g., from a DFT precoder), the reason that CM is not degraded is that the IDFT modulator 56 is periodic every N subcarriers (where N is the total number of subcarriers in the system). In this regard, the mapping in FIG. 9, when performed for precoded samples, is equivalent to a single-carrier mapping by taking into account IDFT periodicity. This is, however, not true for the conventional multi-cluster PUSCH mapping as shown in FIG. 8.

Figure 10:
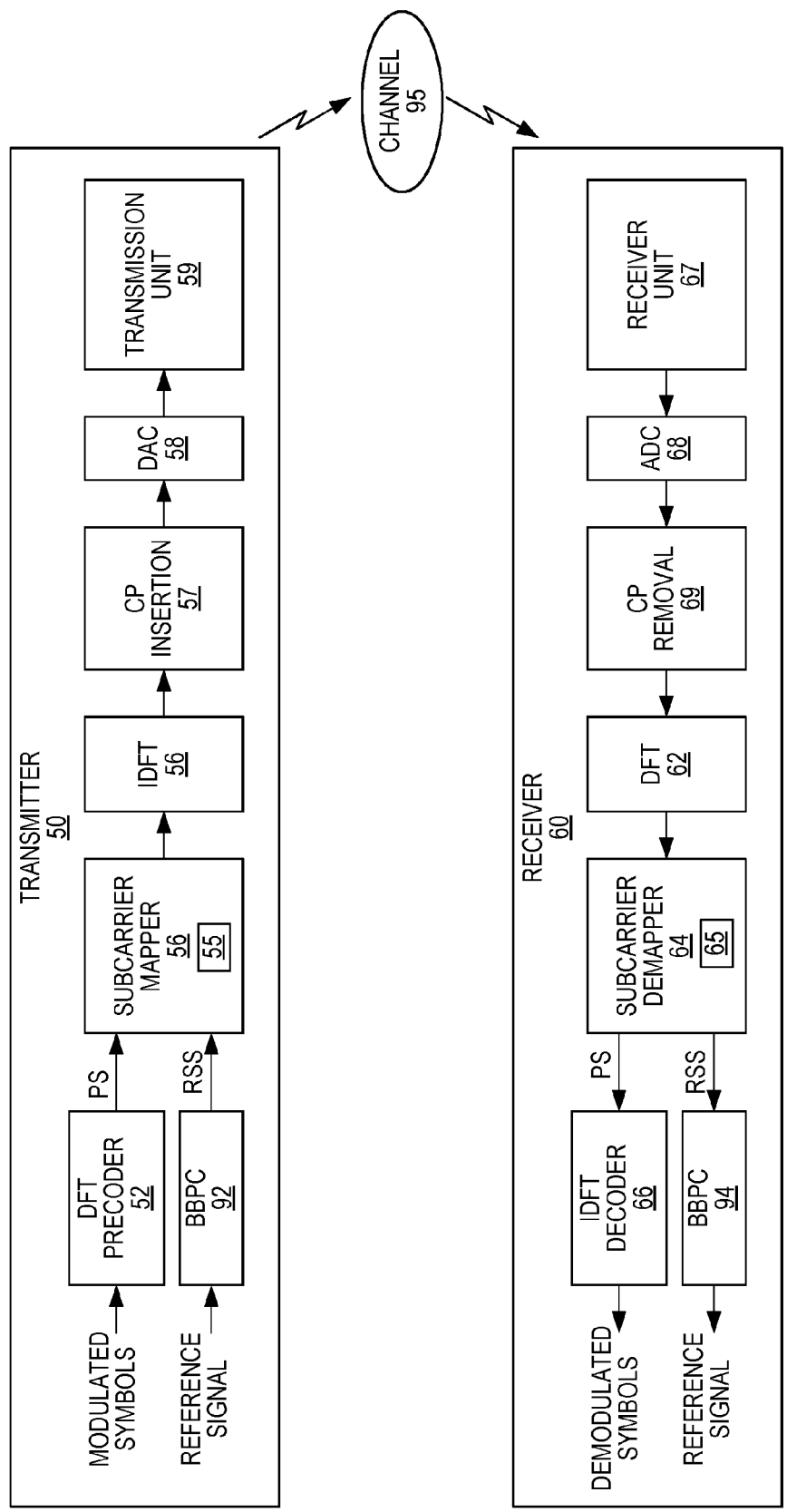
FIG. 10 illustrates a more detailed view of the transmitter and receiver of FIG. 9.

FIG. 10 illustrates an example embodiment of the transmitter 50 and receiver 60 of FIG. 10. As shown in FIG. 10, the transmitter 50 is configured to map precoded samples (PS) output by a DFT precoder 52 and/or or reference signal samples (RSS) output by a broadband processing circuit 92.

Figure 11:
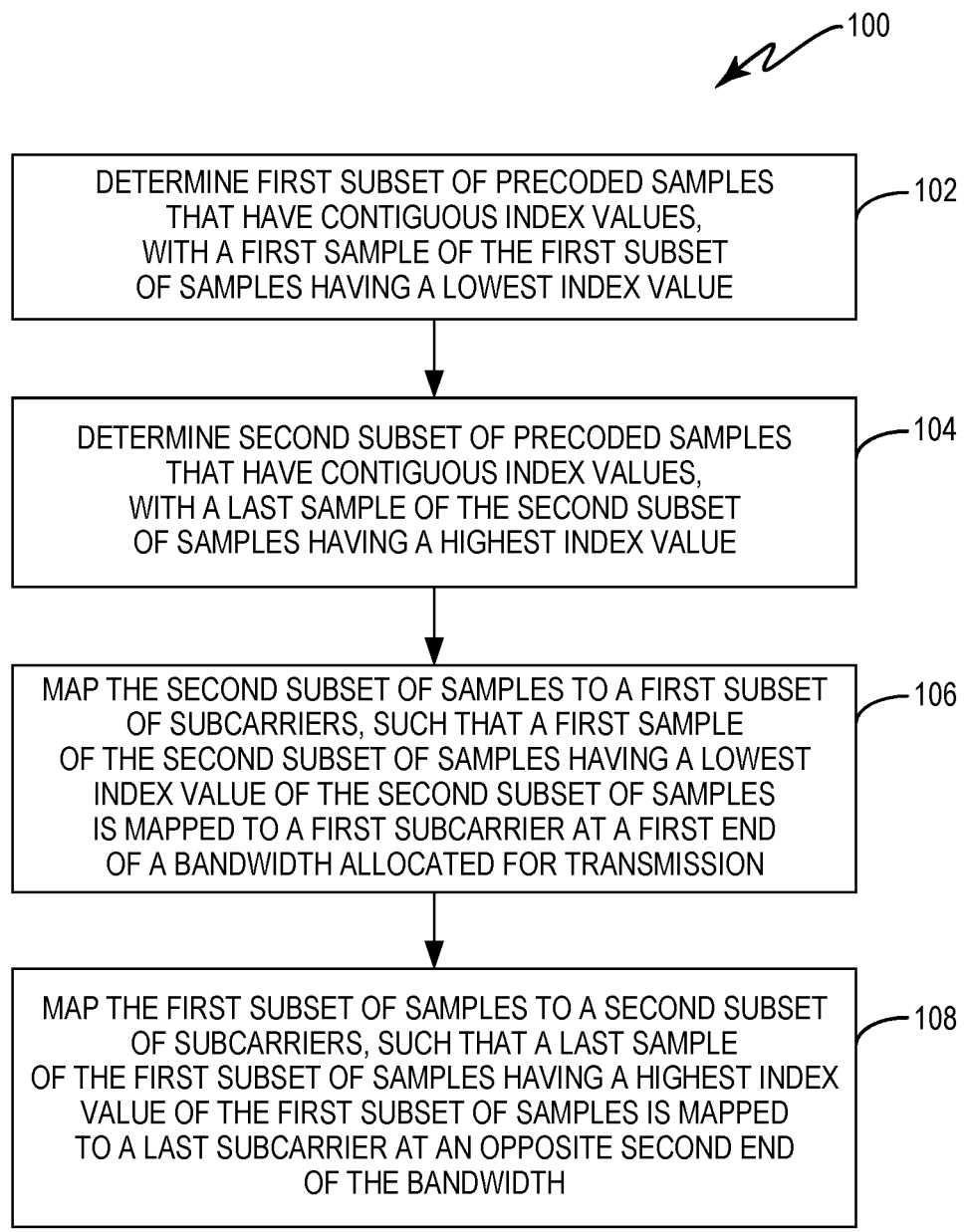
FIG. 11 illustrates an example method of mapping a set of precoded samples of modulation symbols to subcarriers.
Figure 12:
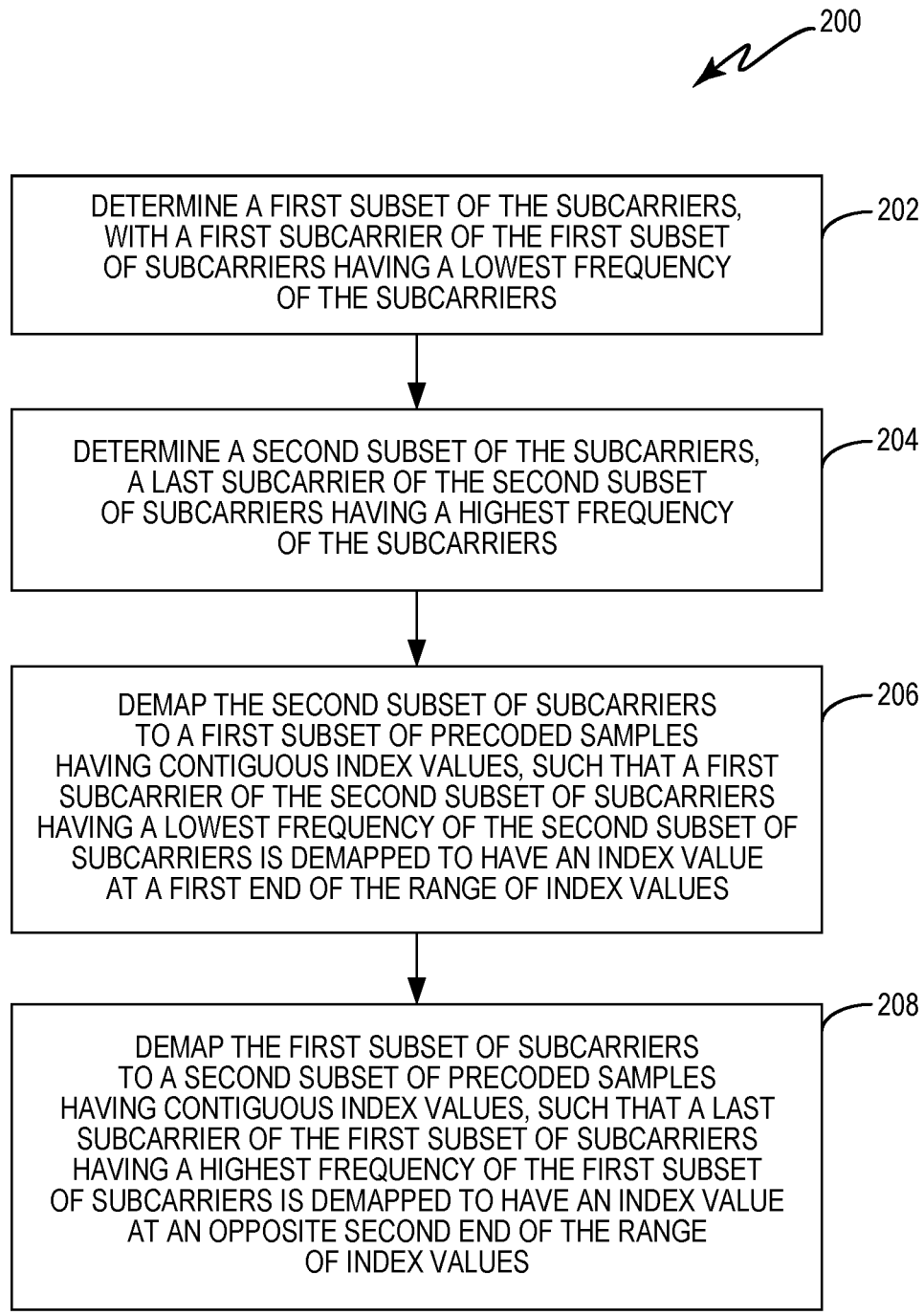
FIG. 12 illustrates an example method of demapping subcarriers to a set of precoded samples of modulation symbols.

With this in mind, FIG. 11 illustrates an example method 100 for mapping a set of precoded samples of modulation symbols to subcarriers within a bandwidth allocated for transmission over a channel 95 (e.g., the PUSCH in a LTE network). For the discussion below, it will be assumed that the transmitter 50 shown in FIG. 9 supports a modified mapping of precoded samples. As shown in FIG. 9, each precoded sample has an associated index value from a set of consecutive index values (e.g., [0]-[7]), and the set 70 of samples are consecutively ordered by their index value.

According to the method 100, a first subset 75 of samples from the set 70 of precoded samples is determined (block 102) that have contiguous index values. A first sample of the first subset 75 of samples has a lowest index value in the set of consecutive index values (i.e., [0]). In FIG. 9 the first subset 75 of samples corresponds to those having index values of [0], [1], [2] and [3], and the "first" of those has the index value of [0].

A second subset 80 of samples is determined (block 104) from the set 70 of precoded samples that have contiguous index values. A last sample of the second subset 80 of samples has a highest index value in the set of consecutive index values. In FIG. 9 the second subset 80 of samples corresponds to those having index values of [4], [5], [6] and [7], and the "last" of those has the index value of [7]. Each index value of the second subset 80 of samples is higher than each index value of the first subset 75 of samples. Also, each precoded sample in the set is included in one of the first or second subsets 75, 80 of samples. That is, there is no precoded sample that is not included in one of the subsets 75, 80 of samples.

The second subset 80 of samples is mapped (block 106) to a first subset 85 of subcarriers of the bandwidth allocated for transmission (i.e., subcarriers 71-74), such that a first sample of the second subset 80 of samples having a lowest index value of the second subset 80 of samples (e.g., that having index value [4]) is mapped to a first subcarrier 71 at a first end of the bandwidth.

The first subset 75 of samples are mapped (block 108) to a second subset 90 of subcarriers of the bandwidth (i.e., subcarriers 76-79), such that a last sample of the first subset 75 of samples having a highest index value of the first subset 75 of samples (e.g., that having index value [3]) is mapped to a last subcarrier 79 at an opposite second end of the bandwidth.

FIG. 11 illustrates a complementary method 200 of demapping subcarriers received within a bandwidth allocated for transmission over a given channel 95 to a set 70 of precoded samples of modulation symbols, such that each precoded sample has an associated index value from a set of consecutive index values (e.g., [0]-[7]), and the set 70 of precoded samples are consecutively ordered by their index value. Here too, FIG. 9 will be used as a non-limiting example to discuss the method 200.

According to the method 200, a first subset 85 of the subcarriers (e.g., subcarriers 71-74) is determined (block 202), wherein a first subcarrier 71 of the first subset 85 of subcarriers has a lowest frequency of the subcarriers. A second subset 90 the subcarriers (e.g., subcarriers 76-79) is also determined (block 204), wherein a last subcarrier 79 of the second subset 90 of subcarriers has a highest frequency of the subcarriers, and wherein the frequency of each subcarrier in the second subset 90 of subcarriers is higher than the frequency of each subcarrier in the first subset 85 of subcarriers.

The second subset 90 of subcarriers is demapped (block 206) to a first subset 75 of precoded samples having contiguous index values (e.g., [0], [1], [2], [3]), such that a first subcarrier 76 of the second subset of subcarriers having a lowest frequency of the second subset of subcarriers is demapped to have an index value at a first end of the range of index values (e.g., index value [0]).

The first subset 85 of subcarriers is demapped (block 208) to a second subset 80 of precoded samples having contiguous index values (e.g., [4], [5], [6], [7]), such that a last subcarrier 74 of the first subset 85 of subcarriers having a highest frequency of the first subset 85 of subcarriers is demapped to have an index value at an opposite second end of the range of index values (e.g., index value [7]). Each precoded sample in the set 70 of samples is included in one of the first or second subsets 75, 80 of samples.

In one or more embodiments, the channel for which the subcarriers are mapped/demapped is the PUSCH in a LTE network. Also, the first and second subsets 75, 80 of precoded samples may each contain a same even number of samples. However, this is not required, and it is understood that the first and second subsets 75, 80 may contain differing numbers of samples. Also, the use of four subcarriers per subset 75, 80 shown in FIG. 9 is also a non-limiting example.

In one embodiment, the first subset 75 of samples is contiguously mapped to the second subset 90 of subcarriers, and the second subset 80 of samples is contiguously mapped to the first subset 85 of subcarriers. Mapping information to be used for the demapping may be received as control signaling from a base station (e.g., base station 550 of FIG. 22).

Figure 21:
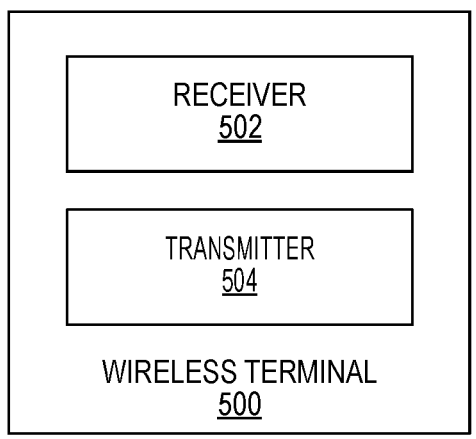
FIG. 21 illustrates a wireless terminal incorporating the transmitter of FIG. 9.
Figure 22:
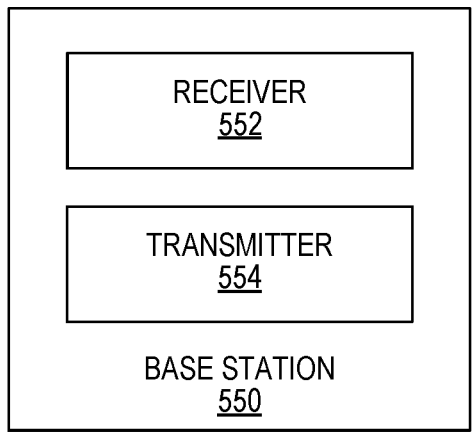
FIG. 22 illustrates an example base station incorporating the receiver of FIG. 9.

Referring again to FIG. 10, in one example, the transmitter 50 is in a user equipment (UE) 500 and the receiver 60 is in a base station 550 (e.g. eNodeB) (see FIGS. 21-22). As shown in FIG. 10, subcarriers from the IDFT 56 undergo cyclic prefix (CP) insertion by CP insertion unit 57, and also undergo digital-to-analog conversion by digital-to-analog converter (DAC) 58. A transmission unit 59 transmits a signal including the subcarriers to the receiver 60.

At the receiver 60, receiver unit 67 receives the signal from transmitter 50, analog-to-digital converter (ADC) unit 68 performs an analog-to-digital conversion, and CP removal unit 69 removes the inserted cyclic prefix and performs error checking. DFT 62, subcarrier demapper 64 and IDFT precoder 66 operate as described above.

Memory units 55, 65 may be used to store subcarrier mapping and demapping information. The memory units 55, 65 may comprise one or several types of memory such as read-only memory (ROM), random-access memory, cache memory, flash memory devices, optical storage devices, etc. The mapping/demapping information may be transmitted from base station 550 (e.g. eNodeB) to UE 500.

Each of the subcarrier mapper 54 and subcarrier demapper 64 may be implemented by one or more microprocessors, Digital Signal Processors (DSPs) and/or Application Specific Integrated Circuits (ASICS), or other programmable devices, while being configured to include processing logic to carry out one or more of the methods described herein and/or illustrated in FIGS. 11-12 and 19-20. It should thus be understood that in some embodiments, at least a portion of the functionality of the present disclosure may be embodied as stored computer instructions in the form of software, firmware, etc.

In one example, the DFT precoder 52 and IDFT 56 may switch positions in the transmitter, and the DFT 62 and IDFT decoder 66 may similarly switch positions in the receiver 60. This is possible due to the similarity of the mathematical operations performed by the DFT precoder and IDFT.

Although FIG. 8 only illustrates eight precoded samples and eight subcarriers, it is understood that this is only an example, and that the subsets may be of any number of a variety of sizes. Moreover, the IDFT unit 56 may have more inputs than the subcarrier mapper 54 has outputs—thus the non-used inputs of the IDFT may have a zero input applied to them.

Example Advantages

The embodiments discussed above have the following advantages compared to prior art: reduced CM for multi-cluster OFDM transmission at band edges, and dynamic switching between single-carrier and multi-cluster transmission without increasing the signaling overhead as compared to current LTE overhead. This is demonstrated by the discussion below.

Figure 13:
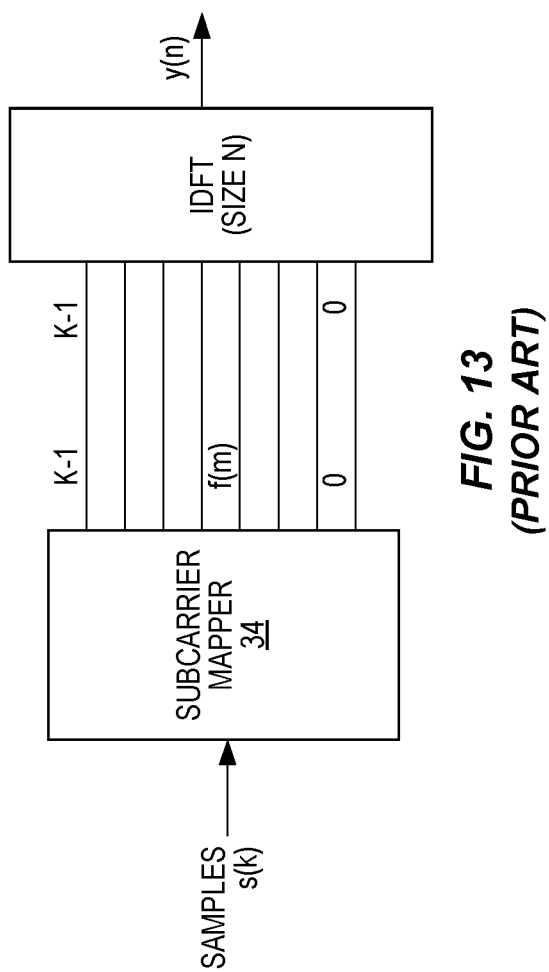
FIGS. 13-18 illustrate example subcarrier mappings.

Consider first a conventional DFTS-OFDM transmitter, as shown in FIG. 13. The output signal y(n) is obtained from the input signal s(k) as:

$$y(n) = \sum_{m=0}^{N-1} f(m)e^{-j2\pi m \frac{n}{N}} = \sum_{m=0}^{K-1}\sum_{k=0}^{K-1} s(k)e^{j2\pi m\left(\frac{n}{N}-\frac{k}{K}\right)} \quad \text{eq. (2)}$$

where the output of the subcarrier mapper 34 has been applied to the first K inputs of an IDFT modulator.

Equation (2) is the reference transfer function for DFTS-OFDM, and it is known to preserve the single carrier property with low CM.

Figure 14:
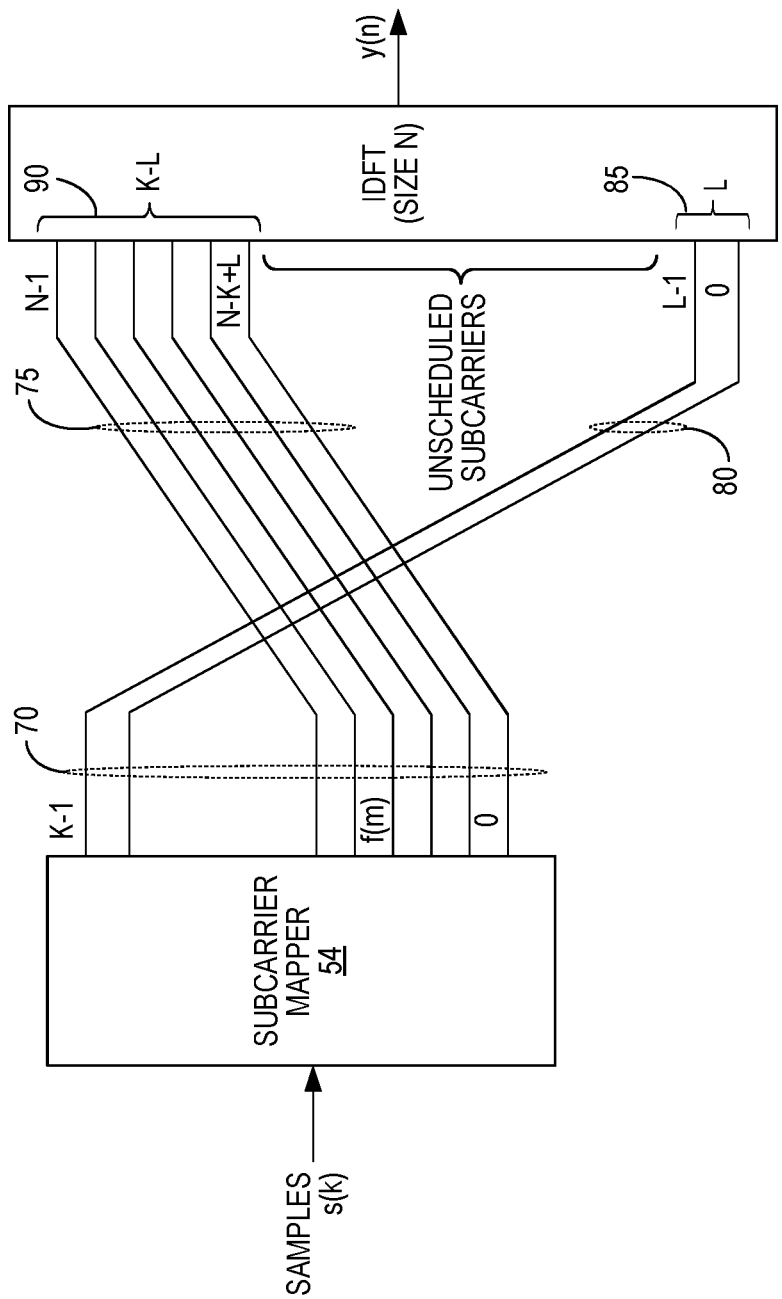

Now consider an example inventive modified mapping as shown in FIG. 14. With the modified mapping according to FIG. 14, the transfer function reads as:

$$y(n) = \sum_{m=0}^{N-1} f(m)e^{-j2\pi m \frac{n}{N}} = \sum_{p=0}^{L-1} f(p+k+l)e^{j2\pi p \frac{n}{N}} + \quad \text{eq. (3)}$$

$$\sum_{q=N-K+L}^{N-1} f(q-N+K-L)e^{j2\pi q \frac{n}{N}}$$

$$= \sum_{p=0}^{L-1}\sum_{k=0}^{K-1} s(k)e^{j2\pi\left(\frac{pn}{N} - \frac{k(p+K-L)}{K}\right)} +$$

$$\sum_{q=N-K+L}^{N-1}\sum_{k=0}^{K-1} s(k)e^{j2\pi\left(\frac{nq}{N} - \frac{k(q-N+K-L)}{K}\right)}$$

Applying the change of variable z=q−N to eq. (3), one obtains:

$$y(n) = \sum_{p=0}^{L-1}\sum_{k=0}^{K-1} s(k)e^{j2\pi p\left(\frac{n}{N}-\frac{k}{K}\right)}e^{-j2\pi k\frac{K-L}{K}} + \quad \text{eq. (4)}$$

$$\sum_{z=-K+L}^{-1}\sum_{k=0}^{K-1} s(k)e^{j2\pi\left(\frac{nz}{N}+n-\frac{k}{K}(z+K-L)\right)}$$

$$= \sum_{t=-K+L}^{L-1}\sum_{k=0}^{K-1} s(k)e^{j2\pi t\left(\frac{n}{N}-\frac{k}{K}\right)}e^{-j2\pi k\frac{K-L}{K}}$$

Applying a new change of variable m=t+K−L to eq. (4) and recognizing that $e^{j2\pi n}=1$, one obtains:

$$y(n) = \sum_{m=0}^{K-1}\sum_{k=0}^{K-1} s(k)e^{j2\pi m\left(\frac{n}{N}-\frac{k}{K}\right)}e^{-j2\pi(K-L)\left(\frac{n}{N}-\frac{k}{K}\right)}e^{-j2\pi k\frac{K-L}{K}} \quad \text{eq. (5)}$$

$$= \sum_{m=0}^{K-1}\sum_{k=0}^{K-1} s(k)e^{j2\pi m\left(\frac{n}{N}-\frac{k}{K}\right)}e^{-j2\pi\left(\frac{K-L}{N}\right)n}$$

Eq. (5) corresponds to the DFTS-OFDM transfer function eq. (2), except for the term $$e^{-j2\pi\left(\frac{K-L}{N}\right)n},$$

which is a phase shift on the output signal that does not affect its amplitude and CM. Therefore, it is shown that the proposed modified mapping allows for clustered subcarrier allocation at band edges while preserving the dynamic signal properties of DFTS-OFDM.

Subcarrier Mapping for Reference Signal Samples

In order to allow efficient use of band edge resources for the PUSCH, it is necessary to sound the quality of those parts of the bandwidth, e.g., by Sounding Reference Signals (SRSs). However, SRSs are typically configured with a SRS sounding bandwidth that spans only the central part of the system bandwidth, i.e., the central part of the bandwidth typically allocated to the PUSCH. It is preferable to avoid sounding the bandwidth corresponding to PUCCH transmission because not all PUCCH formats are compatible with SRS transmission in the same subframe (which would lead to SRS or PUCCH puncturing/dropping), to avoid SRS to PUCCH interference and because link adaptation possibilities for PUCCH are limited. Furthermore, transmitting SRS over an unnecessarily wide bandwidth would lead to potential power starving at the UE.

Considering that, in case of heterogeneous networks, PUSCH might be scheduled at band edges as in FIG. 7, there is increasing interest in sounding at band edges. In order to avoid the above problems, it was proposed in R1-123479 "Enhancements to UL Reference Signals for CoMP, Samsung" to introduce multi-cluster allocation for SRS, which would allow sounding the two band edges (possibly in combinations with parts of the central PUSCH region) without transmitting SRS on the PUCCH region. Even though not many details are provided in R1-123479, it is hinted that the scheme for multi-cluster mapping of PUSCH is reused for SRS.

Figure 15:
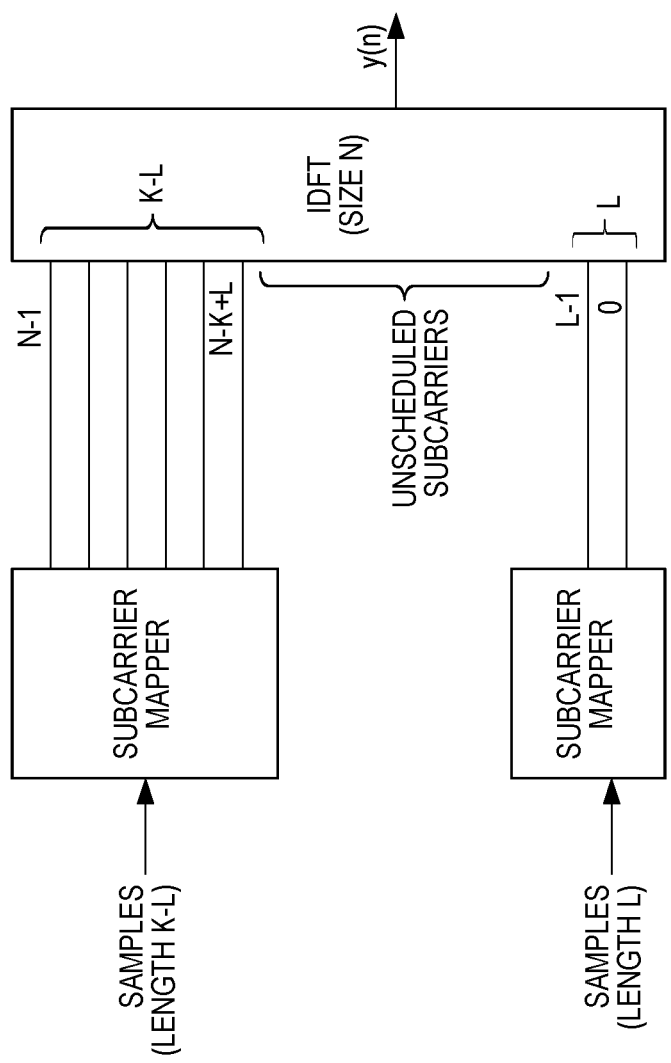
Figure 16:
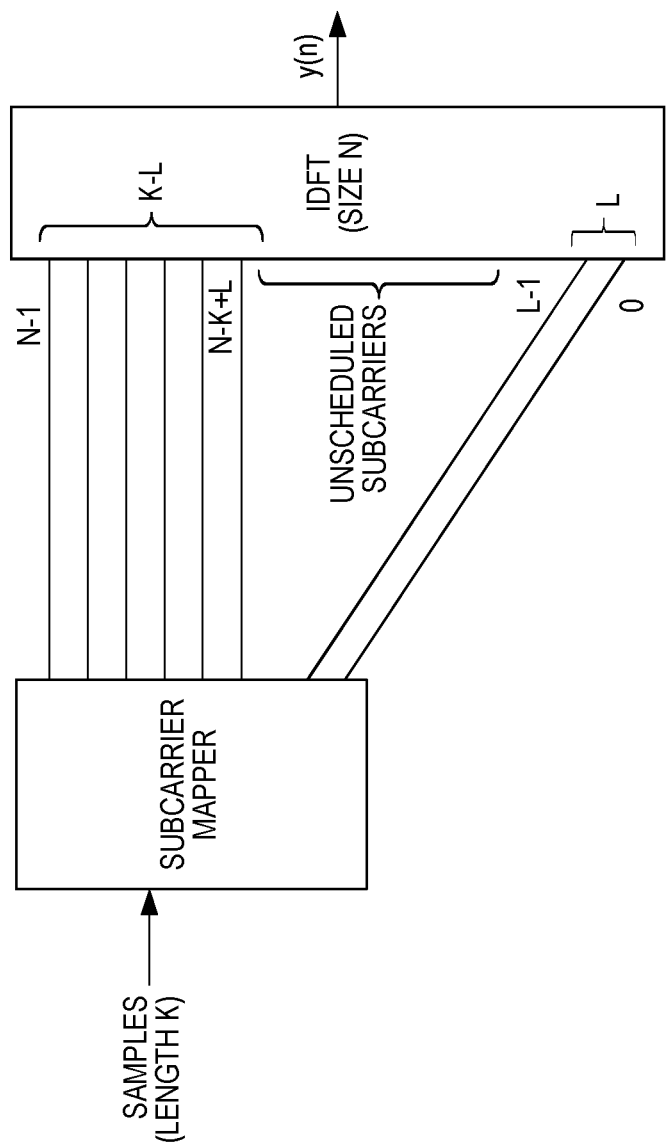

The subcarrier mapping techniques described above can also be useful for mapping and demapping reference signal samples, such as DMRS samples and SRS samples. Two examples of reference signal mapping are shown in FIGS. 15-16. In FIG. 15 two individual SRS sequences are generated, one for each cluster. In FIG. 16 a single reference signal sequence is generated and mapped to the two clusters. In both examples, the CAZAC (impulsive auto-correlation, zero cross-correlation) properties of the source reference signal sequences are lost, resulting in increased CM and possibly inter-reference signal interference compared to a single-cluster conventional reference signal transmission.

Figure 17:
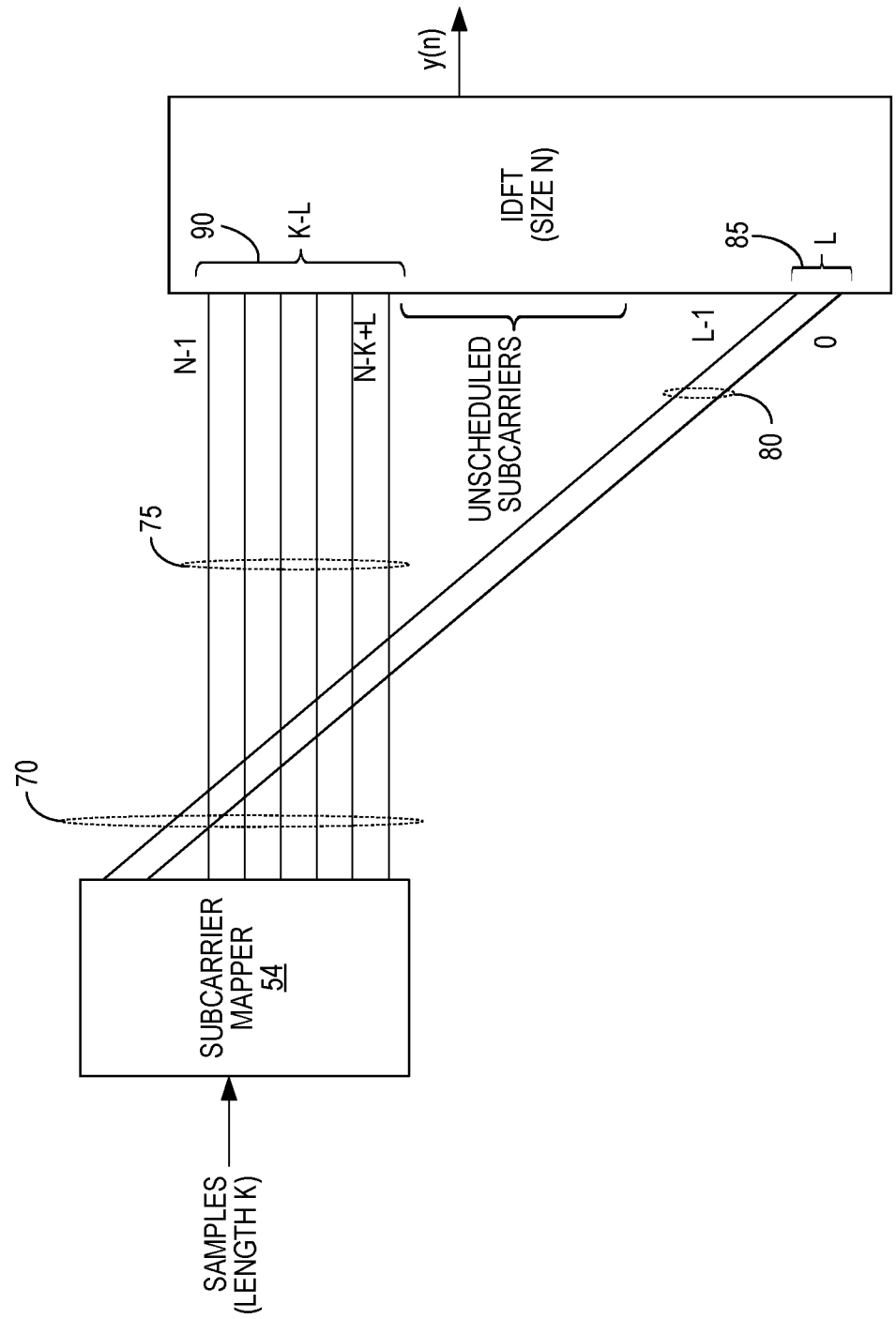

Compared to the examples in FIGS. 15-16, it is proposed here to generate multi-cluster reference signal sequences according to FIG. 17 (e.g., of SRS samples or DMRS samples). FIG. 17 is characterized by a modified subcarrier mapping of an indexed sequence of reference signal between subcarrier mapper 54 and the shown IDFT modulator. The modified mapping is based on the same mathematical principles of the one for the PUSCH (with the difference that sequence of reference signal samples is generated directly in the frequency domain, according to the LTE standard, therefore no DFT precoder is needed). The mapping is based on the same constraints and principles as for PUSCH (i.e., the two sets of indexed reference signal samples should be mapped at cell edges and swapped in the frequency domain). There is no constraint that L should be equal to K/2. The modified mapping enjoys the same CAZAC properties as the source reference signal sequence, even though multi-cluster allocation is in practice achieved in FIG. 17.

In some example embodiments, when signaling to a UE how to allocate reference signal samples based on the modified mapping, the network may signal a unique subcarrier index (e.g., N−K+L in FIG. 17) and a bandwidth parameter (e.g., K). The UE maps the indexed reference signal samples to the subcarriers, in progressive order. When the last subcarrier is reached (subcarrier N−1), the mapping continues from the first subcarrier indexed 0. With such a signaling scheme, it is possible to reuse the signaling scheme for a single cluster and effectively achieve a multi-cluster allocation, provided that the clusters are placed at band edges.

Figure 18:
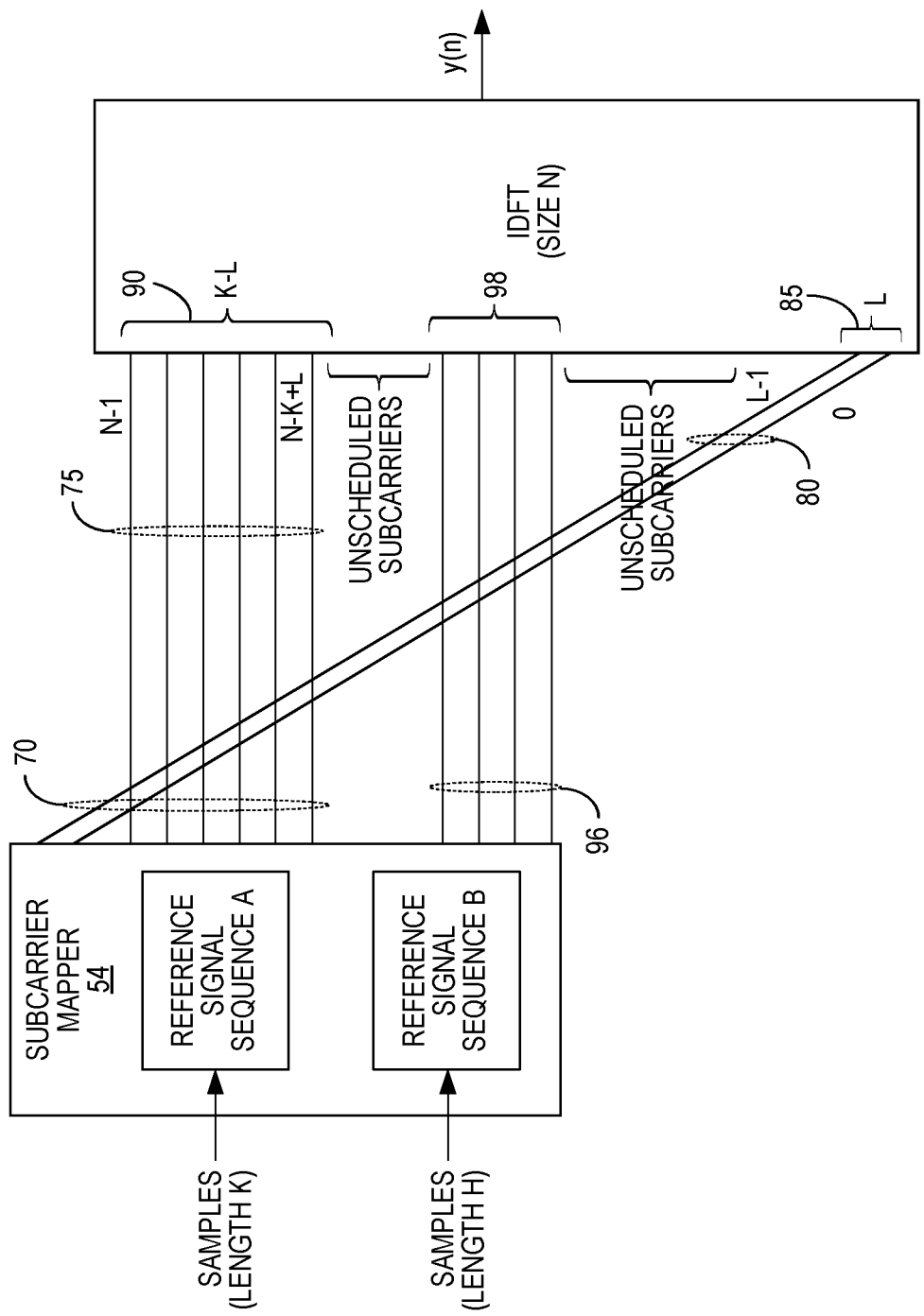

FIG. 18 provides an additional multi-cluster mapping scheme in which three clusters are effectively transmitted (two from sequence A and one from sequence B). However, considering that sequence A is mapped according to the modified mapping, the resulting CM and correlation properties are improved compared to the case where three independent clusters are mapped, as it would be obtained by schemes similar to FIG. 15 and FIG. 16 but with three clusters instead of two. In fact, the CM is in general degraded with an increasing number of clusters.

From a signaling perspective, a resource allocation as in FIG. 18 may be also effectively signaled as a two cluster allocation, where the cluster corresponding to sequence A is mapped to the top and bottom subcarriers as already described. Since methods for signaling two clusters have already been introduced for the PUSCH, similar signaling schemes (adapted to reference signal resource mapping characteristics and granularity) may be employed.

In one or more embodiments, the reference signal samples received into the subcarrier mappers 54 of FIGS. 14-18 are provided by one or more baseband processing circuits 92 (see also FIG. 10), which may be implemented by one or more microprocessors, Digital Signal Processors (DSPs) and/or Application Specific Integrated Circuits (ASICS), or other programmable devices. One or more complementary baseband processing circuits (BBPCs) 94 are included in a receiver (e.g., receiver 60) to receive the demapped samples.

Thus, methods and apparatus similar to those described above may be used for mapping/demapping samples of SRS and DMRS samples instead of mapping/demapping precoded samples.

Figure 19:
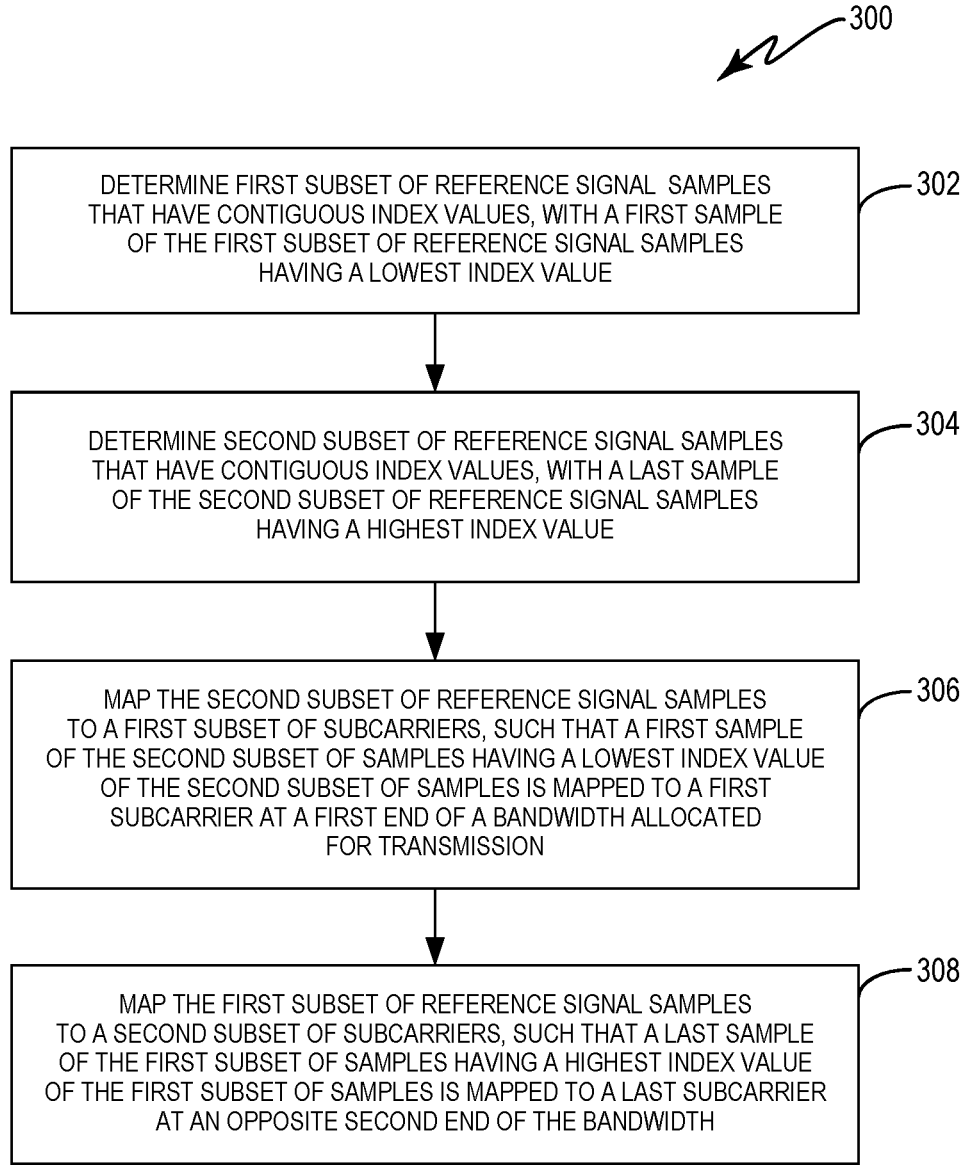
FIG. 19 illustrates an example method of mapping a set of reference signal samples to subcarriers.

FIG. 19 illustrates an example method 300 of mapping a set of reference signal samples to subcarriers within a bandwidth allocated for transmission over a channel. The method 300 applies to a subcarrier mapper 64 that outputs reference signal samples each having an associated index value from a set of consecutive index values, wherein the samples are consecutively ordered by their index value, and the first and second subsets 75, 80 of reference signal samples having contiguous index values (blocks 302, 304). A first sample of the first subset 75 of samples has a lowest index value in the set of consecutive index values, and a last sample of the second subset 80 of samples has a highest index value in the set of consecutive index values. Each index value of the second subset 80 of samples is higher than each index value of the first subset 75 of samples, and each sample is included in one of the first or second subsets 75, 80 of samples. The second subset 80 of samples are mapped (block 306) to a first subset 85 of subcarriers of the bandwidth allocated for transmission, such that a first sample of the second subset 80 of samples having a lowest index value of the second subset 80 of samples is mapped to a first subcarrier at a first end of the bandwidth. The first subset 75 of samples are mapped (block 308) to a second subset 90 of subcarriers of the bandwidth, such that a last sample of the first subset 75 of samples having a highest index value of the first subset 75 of samples is mapped to a last subcarrier at an opposite second end of the bandwidth.

In one or more embodiments, the first subset 75 of reference signal samples are contiguously mapped to the second subset 90 of subcarriers, and the second subset 80 of reference signal samples are contiguously mapped to the first subset 85 of subcarriers. In one or more embodiments, the first subset 85 of subcarriers spans over a first portion of the bandwidth, the second subset 90 of subcarriers spans over a different second portion of the bandwidth, and a third subset 98 of subcarriers which spans over a third portion of the bandwidth is mapped to a third subset 98 of subcarriers of the bandwidth. In one such embodiment, the first and second subsets 75, 80 of reference signal samples form a first reference signal sequence, and the third subset 96 of samples forms a different second reference signal sequence (see FIG. 18).

Figure 20:
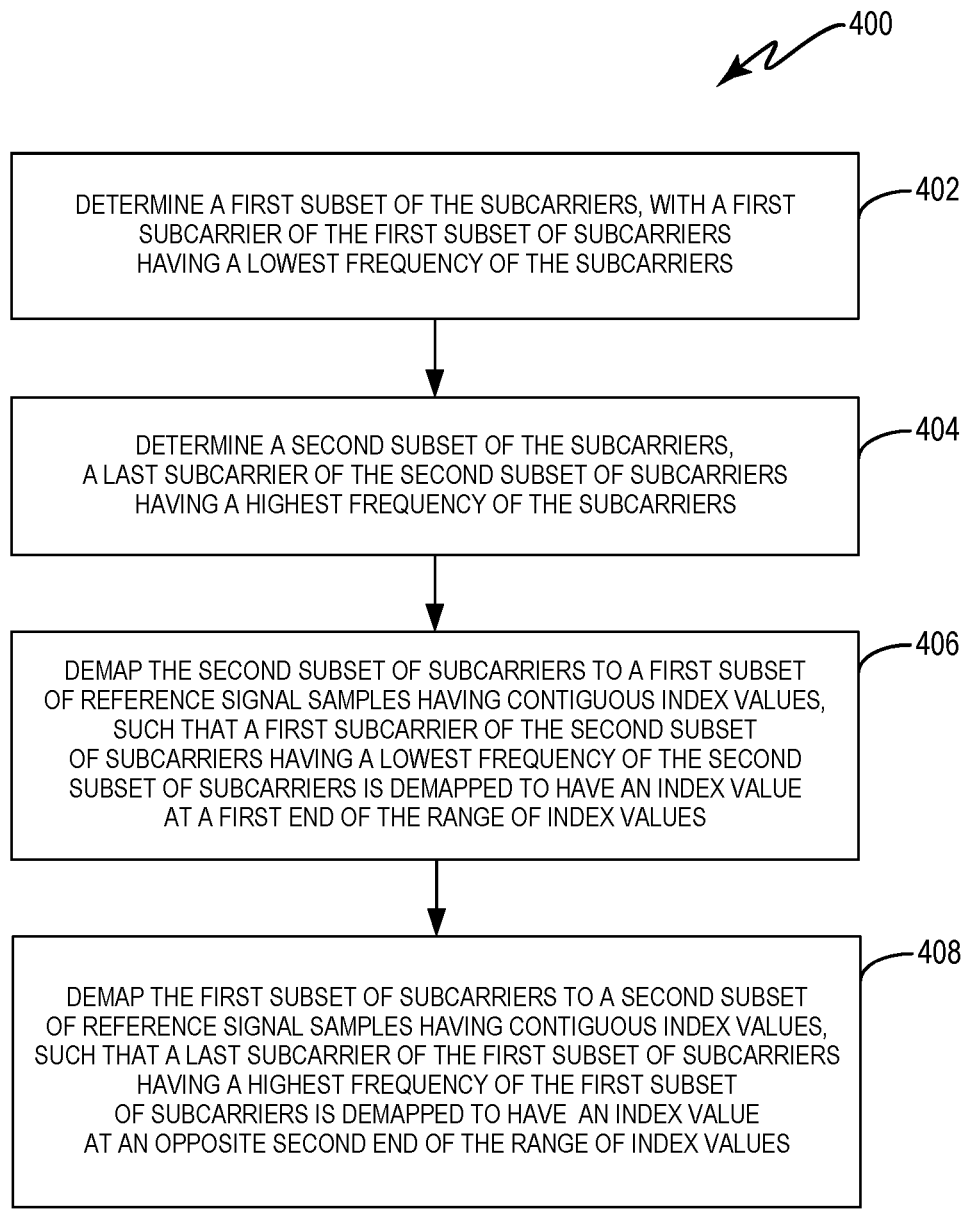
FIG. 20 illustrates an example method of demapping subcarriers to a set of reference signal samples.

In a similar fashion, reference signal demapping may be applied (e.g., for DMRS or SRS samples). FIG. 20 illustrates an example method 400 of demapping subcarriers to a set 70 of reference signal samples. The method 400 demaps subcarriers received within a bandwidth allocated for transmission over a given channel 95 to a set of reference signal samples. Each sample has an associated index value from a set of consecutive index values, and the set of reference signal samples are consecutively ordered by their index value. According to the method 400, a first subset 85 of the subcarriers is determined (block 402), with a first subcarrier of the first subset 85 of subcarriers having a lowest frequency of the subcarriers. A second subset 90 of the subcarriers is also determined (block 404), with a last subcarrier of the second subset 90 of subcarriers having a highest frequency of the subcarriers, and with the frequency of each subcarrier in the second subset 90 of subcarriers being higher than the frequency of each subcarrier in the first subset 85 of subcarriers.

In the reference signal demapping method 400, the second subset 90 of subcarriers is demapped (block 406) to a first subset 75 of samples having contiguous index values, such that a first subcarrier of the second subset 90 of subcarriers having a lowest frequency of the second subset of subcarriers is demapped to have an index value at a first end of the range of index values. The first subset 85 of subcarriers is demapped (block 408) to a second subset 80 of samples having contiguous index values, such that a last subcarrier of the first subset 85 of subcarriers having a highest frequency of the first subset 85 of subcarriers is demapped to have an index value at an opposite second end of the range of index values. Each reference signal sample in the set 70 of reference signal samples is included in one of the first or second subsets 75, 80 of samples.

In one or more embodiments the second subset 90 of subcarriers are contiguously demapped to the first subset 75 of samples, and the first subset 85 of subcarriers are contiguously demapped to the second subset 80 of samples. In one or more embodiments, the first subset 85 of subcarriers spans over a first portion of the bandwidth allocated for transmission, the second subset 90 of subcarriers spans over a different second portion of the bandwidth, and a third subset 98 of subcarriers spanning over a different third portion of the bandwidth are demapped to a third subset 96 of samples. The first, second, and third portions of the bandwidth do not overlap, and the third portion is situated between the first and second portions of the bandwidth. In one such embodiment, the first and second subset 75, 80 of samples form a first reference signal sequence, and the third subset 96 of samples forms a second reference signal sequence.

FIG. 21 illustrates a wireless terminal 500 that includes a receiver 502 and transmitter 504. The transmitter 504 includes subcarrier mapper 54 having one or more processing circuits configured to implement the method 100 and/or the method 300.

FIG. 22 illustrates a base station 550 that includes a receiver 552 and a transmitter 554. The transmitter 554 includes a subcarrier demapper 64 having one or more processing circuits configured to implement the method 200 and/or the method 400.

It should be noted that methods and apparatus described above are effective in not increasing the CM only if the allocation happens at band edges. Furthermore, since the UL transmission is scheduled at both band edges and the channel has typically different fading realizations at band edges, frequency diversity is beneficially provided by the proposed modified multi-cluster allocation. Frequency diversity provides robust performance against worst case fading realizations, which is desirable considering that frequency selective scheduling and most likely even sounding is available at band edges.

Even when data is mapped according to the modified scheme, the Demodulation Reference Sequence (DMRS) could, but does not necessarily need to be mapped or transmitted differently from the existing methods, as long as at least the bandwidth spanned by the PUSCH is illuminated by the DMRS.

Another aspect of this disclosure is that multi-clustering with the modified subcarrier mapping needs to be efficiently signaled to the UE in the scheduling grants. One possibility is to reuse the same (or a similar) scheduling algorithm as the one currently provided for multi-cluster PUSCH. However, this would imply some additional signalling on the side to inform a UE that modified PUSCH mapping needs to be employed.

Another possibility is to employ unused states in the field of UL grants indicating resource allocation for single cluster transmission, for DFTS-OFDM. A large number of states in this field are unemployed, depending on the system bandwidth. Considering that the modified clustering needs to support only relative narrow allocations at band edges and that only symmetrical allocation needs to be supported, it is possible to reuse the unemployed states in the resource allocation field to jointly signal the following:

an indication that a UE should perform modified subcarriers mapping according to the embodiments discussed herein; and the starting position and bandwidth for the granted PUSCH.

Possibly, the number of supported states for signalling modified PUSCH mapping may be reduced by only supporting symmetrical resource allocations in the frequency domain (i.e., allocations where the same number of resource blocks are supported at both band edges).

It is also possible to further optimize the resource allocation field by taking into account that all resource allocations should span up to the band edge. In this case, the resource allocation reduces to indicating the number of RBs to be scheduled at each band edge (or, equivalently, the total number of scheduled RBs).

It should be noted that the part of this disclosure relative to how to efficiently signal multi-cluster allocation at band edges by exploiting unused states in the resource allocation field originally intended for single-carrier OFDM transmission may be exploited even if the modified subcarrier mapping is not supported, but conventional multi-cluster DFTS-OFDM transmission is used. In this case, the advantage would be that the UE would be able to dynamically switch between single-carrier and multi-cluster transmission depending on the states of the resource allocation field, and not based on semi-static RRC configuration in current LTE specifications.

Even though the description above is focused on UE behaviour, it is intended that the receiver needs to perform corresponding steps when scheduling UL transmissions and receiving the corresponding data.

Additionally, although terminology from 3GPP LTE-Advanced has been used in this disclosure to exemplify the embodiments discussed above, this should not be seen as limiting the scope of the present disclosure to only the aforementioned system. Other wireless systems, including Wideband Code Division Multiple Access (WCDMA), Worldwide Interoperability for Microwave Access (Wi-Max), Ultra Mobile Broadband (UMB) and Global System for Mobile Communications (GSM), may also benefit from exploiting the ideas covered within this disclosure.

Also note that terminology such as base station and UE should be considering non-limiting and does in particular not imply a certain hierarchical relation between the two; in general "base station" could be considered as device 1 and "UE" device 2, and these two devices communicate with each other over some radio channel.

Thus, the foregoing description and the accompanying drawings represent non-limiting examples of the methods and apparatus taught herein. As such, the present disclosure is not limited by the foregoing description and accompanying drawings.

What is claimed is:

1. A method, performed by a wireless terminal, of mapping a set of reference signal samples to subcarriers within a bandwidth allocated for transmission over a channel, wherein each sample has an associated index value from a set of consecutive index values, and the set of reference signal samples are consecutively ordered by their index value, the method comprising:

determining a first subset of samples from the set of reference signal samples that have contiguous index values, wherein a first sample of the first subset of samples has a lowest index value in the set of consecutive index values;

determining a second subset of samples from the set of reference signal samples that have contiguous index values, wherein a last sample of the second subset of samples has a highest index value in the set of consecutive index values, wherein each index value of the second subset of samples is higher than each index value of the first subset of samples, and wherein each sample in the set is included in one of the first or second subsets of samples;

mapping the second subset of samples to a first subset of subcarriers of the bandwidth, including mapping a first sample of the second subset of samples having a lowest index value of the second subset of samples to a first subcarrier at a first end of the bandwidth; and mapping the first subset of samples to a second subset of subcarriers of the bandwidth, including mapping a last sample of the first subset of samples having a highest index value of the first subset of samples to a last subcarrier at an opposite second end of the bandwidth.

2. The method of claim 1, wherein:

the first subset of samples are contiguously mapped to the second subset of subcarriers; and the second subset of samples are contiguously mapped to the first subset of subcarriers.

3. The method of claim 1:
wherein the first subset of subcarriers spans over a first portion of the bandwidth;
wherein the second subset of subcarriers spans over a different second portion of the bandwidth;
wherein the method further comprises mapping a third subset of samples to a third subset of subcarriers of the bandwidth;
wherein the third subset of subcarriers span over a third portion of the bandwidth that is situated between the first and second portions of the bandwidth; and
wherein the first, second, and third portions of the bandwidth do not overlap.

4. The method of claim 3, wherein:
the first and second subsets of samples are from a first reference signal sequence; and
the third subset of samples is from a second reference signal sequence.

5. The method of claim 1, wherein the reference signal samples are one of Sounding Reference Signal (SRS) samples and Demodulation Reference Sequence (DMRS) samples.

6. The method of claim 1, wherein the channel comprises a Physical Uplink Shared Channel (PUSCH) in a Long Term Evolution (LTE) network.

7. The method of claim 1, wherein the first subcarrier at the first end of the bandwidth has a lowest frequency of the subcarriers within the bandwidth, and the last subcarrier at the opposite second end of the bandwidth has a highest frequency of the subcarriers within the bandwidth.

8. A wireless terminal operative to map a set of reference signal samples to subcarriers within a bandwidth allocated for transmission over a channel, wherein each sample has an associated index value from a set of consecutive index values, and the set of reference signal samples are consecutively ordered by their index value, the wireless terminal comprising
a subcarrier mapper having one or more processing circuits configured to:
determine a first subset of samples from the set of reference signal samples that have contiguous index values, wherein a first sample of the first subset of samples has a lowest index value in the set of consecutive index values;
determine a second subset of samples from the set of reference signal samples that have contiguous index values, wherein a last sample of the second subset of samples has a highest index value in the set of consecutive index values, wherein each index value of the second subset of samples is higher than each index value of the first subset of samples, and wherein each sample in the set is included in one of the first or second subsets of samples;
map the second subset of samples to a first subset of subcarriers of the bandwidth, including mapping a first sample of the second subset of samples having a lowest index value of the second subset of samples to a first subcarrier at a first end of the bandwidth; and
map the first subset of samples to a second subset of subcarriers of the bandwidth, including mapping a last sample of the first subset of samples having a highest index value of the first subset of samples to a last subcarrier at an opposite second end of the bandwidth.

9. The wireless terminal of claim 8, wherein:
the one or more processing circuits are configured to contiguously map the first subset of samples to the second subset of subcarriers; and
the one or more processing circuits are configured to contiguously map the second subset of samples to the first subset of subcarriers.

10. The wireless terminal of claim 8:
wherein the first subset of subcarriers spans over a first portion of the bandwidth;
wherein the second subset of subcarriers spans over a different second portion of the bandwidth;
wherein the one or more processing circuits are further configured to map a third subset of samples to a third subset of subcarriers of the bandwidth;
wherein the third subset of subcarriers span over a third portion of the bandwidth that is situated between the first and second portions of the bandwidth; and
wherein the first, second, and third portions of the bandwidth do not overlap.

11. The wireless terminal of claim 10, wherein:
the first and second subsets of samples are from a first reference signal sequence; and
the third subset of samples is from a second reference signal sequence.

12. The wireless terminal of claim 8, wherein the reference signal samples are one of Sounding Reference Signal (SRS) samples and Demodulation Reference Sequence (DMRS) samples.

13. The wireless terminal of claim 8, wherein the channel comprises a Physical Uplink Shared Channel (PUSCH) in a Long Term Evolution (LTE) network.

14. The wireless terminal of claim 8, wherein the first subcarrier at the first end of the bandwidth has a lowest frequency of the subcarriers within the bandwidth, and the last subcarrier at the opposite second end of the bandwidth has a highest frequency of the subcarriers within the bandwidth.

15. A method, performed by a base station, of demapping subcarriers received within a bandwidth allocated for transmission over a channel to a set of reference signal samples, such that each sample has an associated index value from a set of consecutive index values, and the set of reference signal samples are consecutively ordered by their index value, the method comprising:
determining a first subset of the subcarriers of the bandwidth, wherein a first subcarrier of the first subset of subcarriers has a lowest frequency of the subcarriers;
determining a second subset of the subcarriers, wherein a last subcarrier of the second subset of subcarriers has a highest frequency of the subcarriers, and wherein the frequency of each subcarrier in the second subset of subcarriers is higher than the frequency of each subcarrier in the first subset of subcarriers;
demapping the second subset of subcarriers to a first subset of samples having contiguous index values, such that a first subcarrier of the second subset of subcarriers having a lowest frequency of the second subset of subcarriers is demapped to have an index value at a first end of the range of index values; and
demapping the first subset of subcarriers to a second subset of samples having contiguous index values, such that a last subcarrier of the first subset of subcarriers having a highest frequency of the first subset of subcarriers is demapped to have an index value at an opposite second end of the range of index values, wherein each sample in the set of reference signal samples is included in one of the first or second subsets of samples.

16. The method of claim 15, wherein:
the second subset of subcarriers are contiguously demapped to the first subset of samples; and
the first subset of subcarriers are contiguously demapped to the second subset of samples.

17. The method of claim 15, wherein the first subset of subcarriers spans over a first portion of the bandwidth, and the second subset of subcarriers spans over a different second portion of the bandwidth, the method further characterized by:
demapping a third subset of subcarriers of the bandwidth to a third subset of samples;
wherein the third subset of subcarriers span over a third portion of the bandwidth that is situated between the first and second portions of the bandwidth; and
wherein the first, second, and third portions of the bandwidth do not overlap.

18. The method of claim 17, wherein:
the first and second subsets of samples form a first reference signal sequence; and
the third subset of samples form a second reference signal sequence.

19. The method of claim 15, wherein the reference signal samples are one of Sounding Reference Signal (SRS) samples and Demodulation Reference Sequence (DMRS) samples.

20. The method of claim 15, wherein the channel comprises a Physical Uplink Shared Channel (PUSCH) in a Long Term Evolution (LTE) network.

21. The method of claim 15, wherein the index value at the first end of the range of index values is a lower index value than the index value at the opposite second end of the range of index values.

22. A base station operative to demap subcarriers received within a bandwidth allocated for transmission over a channel to a set of reference signal samples, such that each sample has an associated index value from a range of consecutive index values, and the set of reference signal samples are consecutively ordered by their index value, the base station comprising:
a subcarrier demapper including one or more processing circuits configured to:
determine a first subset of the subcarriers of the bandwidth, wherein a first subcarrier of the first subset of subcarriers has a lowest frequency of the subcarriers;
determine a second subset of the subcarriers, wherein a last subcarrier of the second subset of subcarriers has a highest frequency of the subcarriers, and wherein the frequency of each subcarrier in the second subset of subcarriers is higher than the frequency of each subcarrier in the first subset of subcarriers;

demap the second subset of subcarriers to a first subset of reference signal samples having contiguous index values, such that a first subcarrier of the second subset of subcarriers having a lowest frequency of the second subset of subcarriers is demapped to have an index value at a first end of the range of index values; and
demap the first subset of subcarriers to a second subset of reference signal samples having contiguous index values, such that a last subcarrier of the first subset of subcarriers having a highest frequency of the first subset of subcarriers is demapped to have an index value at an opposite second end of the range of index values, wherein each sample in the set of reference signal samples is included in one of the first or second subsets of samples.

23. The base station of claim 22, wherein:
the one or more processing circuits are configured to contiguously demap the second subset of subcarriers to the first subset of samples; and
the one or more processing circuits are configured to contiguously demap the first subset of subcarriers to the second subset of samples.

24. The base station of claim 22:
wherein the first subset of subcarriers spans over a first portion of the bandwidth;
wherein the second subset of subcarriers spans over a different second portion of the bandwidth;
wherein the one or more processing circuits are further configured to demap a third subset of subcarriers of the bandwidth to a third subset of samples;
wherein the third subset of subcarriers span over a third portion of the bandwidth that is situated between the first and second portions of the bandwidth; and
wherein the first, second, and third portions of the bandwidth do not overlap.

25. The base station of claim 24, wherein:
the first and second subsets of samples form a first reference signal sequence; and
the third subset of samples form a second reference signal sequence.

26. The base station of claim 22, wherein the reference signal samples are one of Sounding Reference Signal (SRS) samples and Demodulation Reference Sequence (DMRS) samples.

27. The base station of claim 22, wherein the channel comprises a Physical Uplink Shared Channel (PUSCH) in a Long Term Evolution (LTE) network.

28. The base station of claim 22, wherein the index value at the first end of the range of index values is a lower index value than the index value at the opposite second end of the range of index values.

* * * * *